US010775172B2

(12) United States Patent
Kuisma

(10) Patent No.: US 10,775,172 B2
(45) Date of Patent: *Sep. 15, 2020

(54) PIEZOELECTRIC GYROSCOPE WITH TRANSVERSAL DRIVE TRANSDUCER

(71) Applicant: MURATA MANUFACTURING CO., LTD., Nagaokakyo-shi, Kyoto (FI)

(72) Inventor: Heikki Kuisma, Helsinki (FI)

(73) Assignee: MURATA MANUFACTURING CO., LTD., Nagaokakyo-Shi, Kyoto (JP)

( * ) Notice: Subject to any disclaimer, the term of this patent is extended or adjusted under 35 U.S.C. 154(b) by 205 days.

This patent is subject to a terminal disclaimer.

(21) Appl. No.: 15/988,644

(22) Filed: May 24, 2018

(65) Prior Publication Data

US 2018/0340775 A1 Nov. 29, 2018

(30) Foreign Application Priority Data

May 24, 2017 (FI) ..................... 20175467
May 24, 2017 (FI) ..................... 20175469
(Continued)

(51) Int. Cl.
*G01C 19/5712* (2012.01)
*G01C 19/5769* (2012.01)
(Continued)

(52) U.S. Cl.
CPC ..... *G01C 19/5712* (2013.01); *G01C 19/5642* (2013.01); *G01C 19/5747* (2013.01); *G01C 19/5769* (2013.01)

(58) Field of Classification Search
CPC ........... G01C 19/5712; G01C 19/5719; G01C 19/574; G01C 19/5642; G01C 19/5747; G01C 19/5769
See application file for complete search history.

(56) References Cited

U.S. PATENT DOCUMENTS 5,166,571 A 11/1992 Konno et al.
6,561,028 B1 5/2003 Aigner et al.
(Continued)

FOREIGN PATENT DOCUMENTS

EP 1 688 705 A2 8/2006
EP 2 899 503 A1 7/2015
(Continued)

OTHER PUBLICATIONS

Finnish Search Report corresponding to Appln. No. 20175467, dated Dec. 21, 2017.
(Continued)

*Primary Examiner* — Helen C Kwok
(74) *Attorney, Agent, or Firm* — Squire Patton Boggs (US) LLP

(57) ABSTRACT

This disclosure relates to a microelectromechanical gyroscope comprising a substrate with an inertial mass suspended from a suspension structure which allows the first inertial mass to oscillate rotationally both in the device plane and out of the device plane. The suspension structures comprises one or more suspenders coated with piezoelectric transducer structures configured to detect oscillating motion out of the device plane or in the device plane. The gyroscope also comprises a synchronization structure which includes a synchronization spring attached to the first inertial mass at a first attachment point and to the second inertial mass at a second attachment point. The synchronization spring is coated with a piezoelectric transducer structure configured to detect the oscillating motion of the suspended inertial mass out of the device plane.

12 Claims, 12 Drawing Sheets

(30) Foreign Application Priority Data

Sep. 25, 2017 (FI) .................................... 20175850
Oct. 11, 2017 (FI) .................................... 20175892

(51) Int. Cl.
    *G01C 19/5642*      (2012.01)
    *G01C 19/5747*      (2012.01)

(56) References Cited

U.S. PATENT DOCUMENTS

| | | |
|---|---|---|
| 2004/0250620 A1 | 12/2004 | Nicu et al. |
| 2005/0066728 A1* | 3/2005 | Chojnacki ......... G01C 19/5719 73/514.16 |
| 2006/0156813 A1* | 7/2006 | Blomqvist ......... G01C 19/5712 73/504.12 |
| 2006/0156814 A1 | 7/2006 | Blomqvist |
| 2006/0169041 A1 | 8/2006 | Madni et al. |
| 2009/0320594 A1 | 12/2009 | Ohuchi et al. |
| 2010/0077858 A1 | 4/2010 | Kawakubo et al. |
| 2010/0083756 A1 | 4/2010 | Merz et al. |
| 2010/0222998 A1* | 9/2010 | Blomqvist ......... G01C 19/5747 701/532 |
| 2010/0242604 A1 | 9/2010 | Sammoura et al. |
| 2010/0309536 A1 | 12/2010 | Akanuma et al. |
| 2010/0313657 A1 | 12/2010 | Trusov et al. |
| 2011/0132087 A1 | 6/2011 | Ohms et al. |
| 2011/0265564 A1 | 11/2011 | Acar et al. |
| 2011/0270569 A1* | 11/2011 | Stephanou ......... G01C 19/5712 702/141 |
| 2013/0019682 A1 | 1/2013 | Hsu |
| 2013/0068018 A1* | 3/2013 | Seeger ............... G01C 19/5712 73/504.12 |
| 2013/0091948 A1 | 4/2013 | Yamamoto |
| 2013/0283909 A1 | 10/2013 | Furuhata |
| 2014/0266170 A1 | 9/2014 | Seeger et al. |
| 2014/0283602 A1 | 9/2014 | Yamamoto |
| 2015/0013455 A1* | 1/2015 | Deimerly ......... G01C 19/5747 73/511 |
| 2015/0068308 A1* | 3/2015 | Blomqvist ........... B81B 7/0058 73/504.12 |
| 2015/0316377 A1 | 11/2015 | Gerson et al. |
| 2016/0146605 A1* | 5/2016 | Furuhata ............ G01C 19/5712 73/504.12 |
| 2016/0211778 A1 | 7/2016 | Okada et al. |
| 2018/0340776 A1* | 11/2018 | Kuisma ............... G01C 19/5747 |
| 2018/0340955 A1* | 11/2018 | Kuisma ............... H01L 41/0946 |
| 2018/0342667 A1* | 11/2018 | Kuisma ............... H01L 41/1136 |

FOREIGN PATENT DOCUMENTS

| | | |
|---|---|---|
| EP | 3 034 997 A1 | 6/2016 |
| JP | 2002-267451 A | 9/2002 |
| JP | 2010-256332 A | 11/2010 |
| JP | 2011158319 | 8/2011 |
| JP | 2012-149961 A | 8/2012 |
| JP | 2016-001157 A | 1/2016 |
| WO | 2006/039560 A2 | 4/2006 |
| WO | 2011/136972 A1 | 11/2011 |
| WO | 2016/097117 A1 | 6/2016 |

OTHER PUBLICATIONS

Jing-Quan Liu et al., "A MEMS-based piezoelectric power generator array for vibration energy harvesting", Microelectronics Journal, Elsevier Ltd., Feb. 20, 2008, vol. 39, No. 5, pp. 802-806.

Pradeep Pai et al., "Magnetically Coupled Resonators for Rate Integrating Gyroscopes", 2014 IEEE Sensors, Nov. 2, 2014, 4 pages.

Finnish Search Report corresponding to Appln. No. 20175892, dated Apr. 18, 2018.

Finnish Search Report corresponding to Appln. No. 20175469, dated Dec. 21, 2017.

I. Roland et al., GaAs-based tuning fork microresonators: A first step towards a GaAs-based coriolis 3-axis Micro-Vibrating Rate Gyro (GaAs 3-axis µCVG), Sensors and Actuators A: Physical, Jul. 19, 2011, vol. 172, No. 1, pp. 204-211.

Finnish Search Report corresponding to Appln. No. 20175850, dated Apr. 18, 2018.

European Search Report application No. EP 18 17 3764 dated Sep. 25, 2018.

European Search Report application No. EP 18 17 3736 dated Sep. 26, 2018.

European Search Report application No. EP 18 17 3725 dated Sep. 20, 2018.

European Search Report application No. EP 18 17 3731 dated Sep. 19, 2018.

* cited by examiner

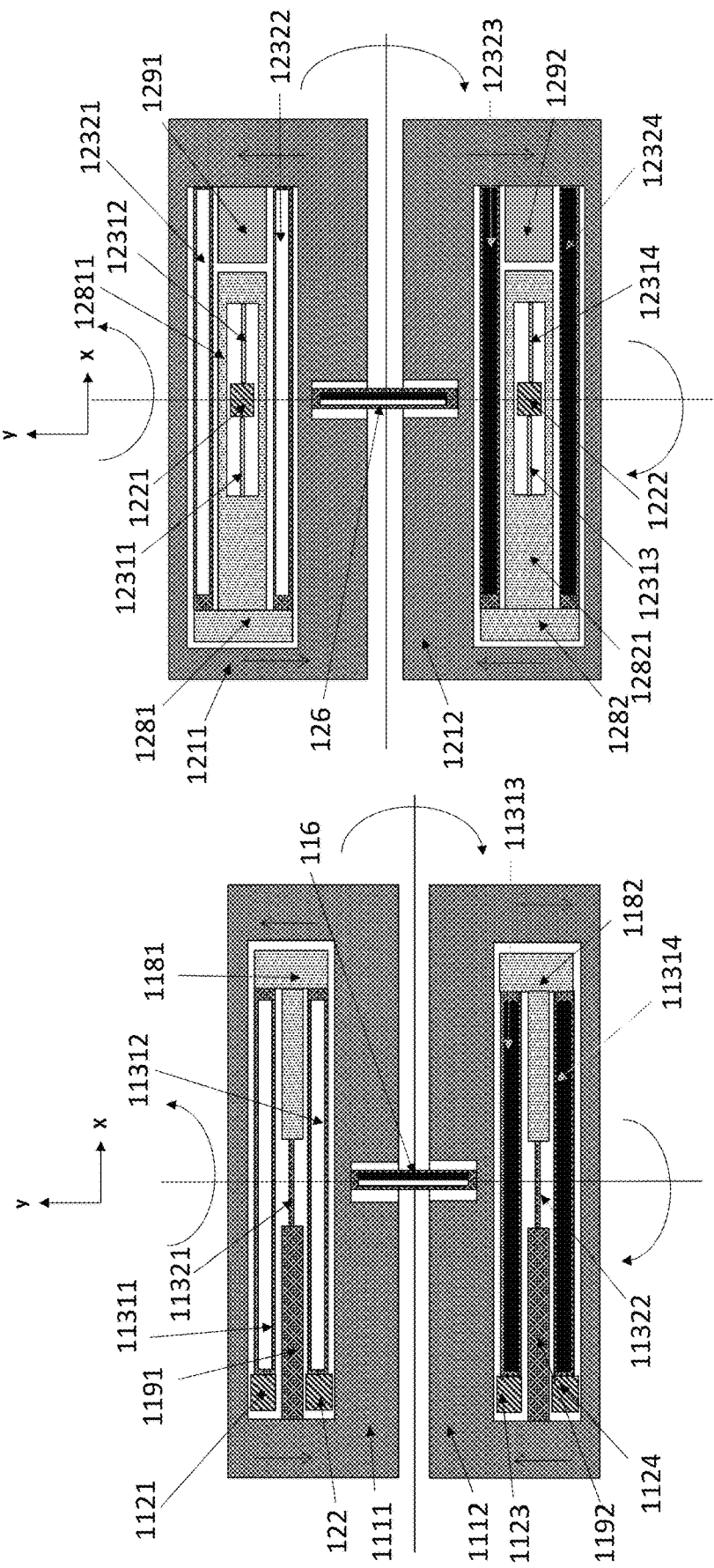

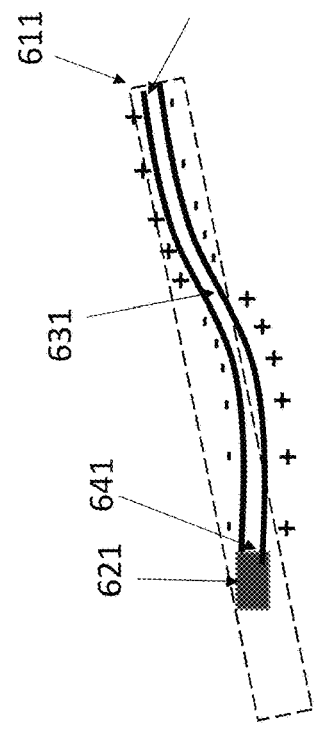
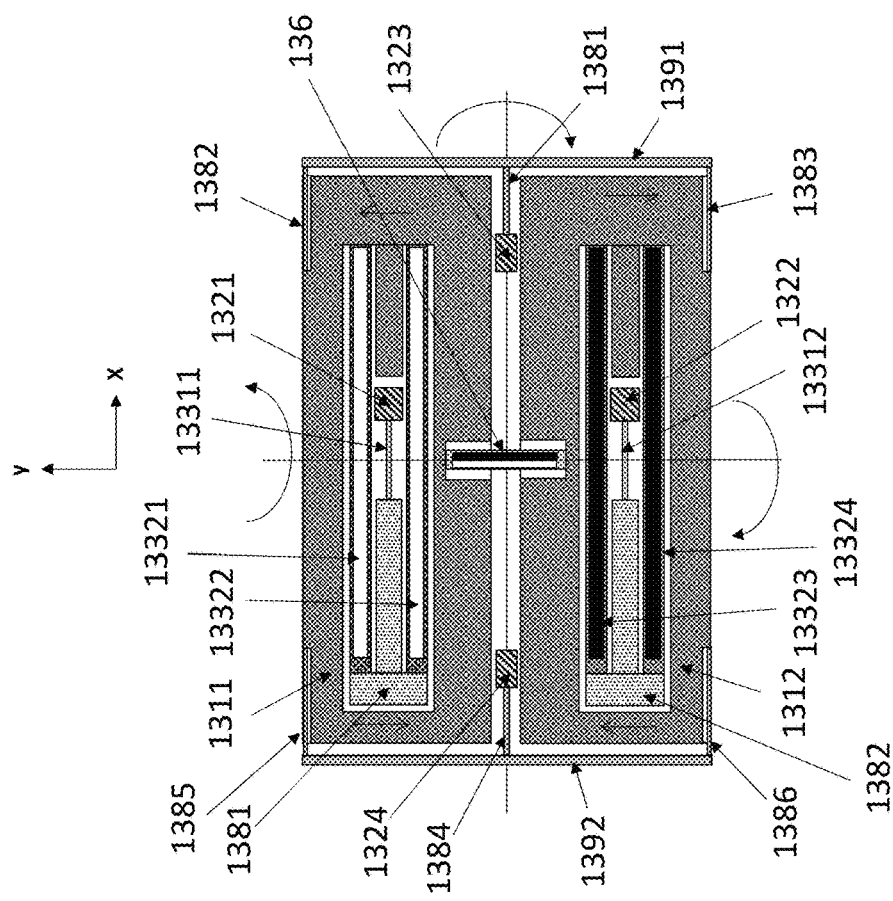
Figure 14a
Figure 13

PIEZOELECTRIC GYROSCOPE WITH TRANSVERSAL DRIVE TRANSDUCER

FIELD OF THE DISCLOSURE

The present disclosure relates to microelectromechanical (MEMS) gyroscopes, and more particularly to MEMS gyroscopes where one or more inertial masses are driven into rotational motion by piezoelectric actuation or where the rotational motion of one or more inertial masses is detected by piezoelectric means.

BACKGROUND OF THE DISCLOSURE

MEMS gyroscopes use the Coriolis effect to measure angular velocity. In a vibrating MEMS gyroscope, an inertial mass is driven into oscillating movement by an actuating drive force. This oscillation will be called "drive oscillation" in this disclosure. The drive oscillation can be either linear or rotational, but this disclosure focuses exclusively on applications where it is rotational. FIG. 1 illustrates schematically an inertial mass 111 driven in rotational oscillation about the z-axis. The drive oscillation is indicated with a solid black arrow. The actuating drive force can be generated, for example, with an electrostatic, magnetic or piezoelectric drive transducer. This disclosure focuses exclusively on applications the actuating force is generated piezoelectrically.

When a gyroscope containing an inertial mass in drive oscillation undergoes an angular rotation rate $\Omega$ about a secondary axis (not parallel to the primary axis), the inertial mass is affected by the Coriolis-effect which is accompanied by a Coriolis force and torque. The Coriolis force and torque are determined by the magnitude and direction of the angular rotation rate vector and the inertial mass velocity and angular velocity vectors. An inertial mass in linear drive oscillation will undergo an oscillating Coriolis force. An inertial mass in rotational drive oscillation will undergo an oscillating Coriolis torque. This force or torque oscillates the inertial mass about a secondary axis perpendicular to the primary axis. Oscillation along or about the secondary axis will be called "sense oscillation" in this disclosure.

In FIG. 1 an angular rotation rate $\Omega$ about the x-axis is indicated with a white arrow, and the resulting sense oscillation about the y-axis is indicated with a grey arrow. To measure the angular rotation rate $\Omega$, the sense oscillation may be measured through a capacitive, piezoelectric or piezoresistive transducer. The resulting electrical signal may be called a sense signal. This disclosure focuses exclusively on applications where the sense oscillation is measured with a piezoelectric transducer.

Gyroscopes with a single, piezoelectrically actuated inertial mass in rotational oscillation are susceptible to disturbances arising from external rotary vibrations. They may also suffer from acoustic losses due to mechanical coupling from the inertial mass and the suspenders to the fixed base, because even a fixed base has a finite mass and may be mobile to a degree. These problems may be circumvented with gyroscopes which include two inertial masses. The two inertial masses may be mechanically coupled to each other to oscillate synchronously.

The two inertial masses can be driven into anti-phase oscillation. In this disclosure, "synchronous anti-phase oscillation" means oscillation where, at any given time during the oscillation cycle, the first mass rotates clockwise about a first axis when the second mass rotates at equal angular velocity counter-clockwise about a second axis which is parallel with the first axis. When the first mass turns from clockwise rotation to counter-clockwise rotation about the first axis, the second turns from counter-clockwise to clockwise rotation about the second axis. In anti-phase oscillation, the torques exerted by the two inertial masses on the fixed base will be equal but opposite, and will cancel each other so that no rotational oscillation will be coupled to the fixed base even if it has a finite mass or is not totally immobile. The effect of external rotational vibrations on each inertial mass will also be equal, and by reading the sense transducers in a differential manner this effect can be cancelled in the sense signal.

FIG. 2a illustrates schematically a gyroscope with two inertial masses 211 and 212 oscillating in two different directions about the z-axis perpendicular to the xy-plane. The arrows are reversed in the second oscillation phase where the masses rotate in the opposite direction. The xy-plane defines the initial rest position of the inertial masses. The xy-plane will be called the device plane in this disclosure. Oscillation about the z-axis which is perpendicular to this plane will be called in-plane oscillation, or oscillation in the device plane, in this disclosure. FIG. 2b illustrates schematically a gyroscope where the same inertial masses 211 and 212 oscillate in two different directions about the y-axis, which lies in the device plane. The degree of rotation has been greatly exaggerated. As they oscillate about the y-axis, the masses 211 and 212 rotate out of the device plane. This oscillation mode will be called out-of-plane oscillation, or oscillation out of the device plane, in this disclosure.

In both FIGS. 2a and 2b, the two inertial masses are coupled to each other by a transversal synchronization spring 26. With a suitably constructed synchronization spring, driving only one of the inertial masses 211 and 212 into drive oscillation with a drive transducer (not illustrated) is sufficient to set the other inertial mass into anti-phase drive oscillation with the same frequency. However, it is also possible to drive both inertial masses 211 and 212 into drive oscillation with two separate drive transducers. The sense oscillation, which will occur in both inertial masses, can be read through a sense transducer connected to either one of the inertial masses 211 and 212, or through two or more sense transducers, each one connected to either mass.

As illustrated in FIGS. 2a and 2b, inertial masses in piezoelectrically driven MEMS gyroscopes may have an oblong shape. They have a longitudinal length in the x-direction which exceeds their transversal width in the y-direction.

The terms "longitudinal" and "transversal" will be used throughout this disclosure to refer to the illustrated x- and y-directions, respectively. The longitudinal measure of an object may be referred to as a "length" and the transversal measure of an object will may be referred to as a "width". However, since the synchronization spring 26 is oriented in the transversal direction (y-direction), its transversal measure may be referred to as its "length", and its longitudinal measure may be referred to as a "width". The term "vertical" will be used to refer to the z-direction, and the corresponding measure will be referred to as a "thickness".

One way to build a piezoelectrically driven or sensed inertial mass is to shape the inertial mass so that it at least partly surrounds the anchor point or anchor points from which it is suspended. In other words, the inertial mass may be shaped like an open or closed frame and a suspension structure may be constructed between a centrally located anchor point and fixing points on the inner edge of the inertial mass.

Document WO2011136972 discloses a piezoelectric gyroscope where piezoelectric transducers have been placed on suspenders which suspend an inertial mass from a central anchor point.

Certain technical problems are frequently encountered in piezoelectrically driven and sensed gyroscopes. One is that the transducers which drive the oscillation must be sufficiently large to generate enough actuation force, and the transducers which sense oscillation must be sufficiently large to produce a signal with a high signal-to-noise ratio. Furthermore, the drive oscillation movement may not be perfectly orthogonal to sense oscillation movement, which may introduce drive motion error components into the sense signal. This can be serious problem because the amplitude of the drive oscillation is usually much larger than the amplitude of the sense oscillation. A further problem is that the bending mode of the piezoelectric transducers may not exhibit uniform curvature along the entire length of the transducer, which can reduce both the drive force and the sense signal.

These problems have hindered the development of piezoelectric rotational gyroscopes in comparison to electrostatically driven and sensed gyroscopes, even though electrostatic gyroscopes require high bias voltages, consume more surface area and produce a capacitive output signal which is inversely proportional to the operating frequency, making high frequency operation unpractical despite its advantageousness due to smaller sensitivity to external vibrations.

BRIEF DESCRIPTION OF THE DISCLOSURE

An object of the present disclosure is to provide an apparatus for overcoming the above problems.

The objects of the disclosure are achieved by an arrangement which is characterized by what is stated in the independent claims. The preferred embodiments of the disclosure are disclosed in the dependent claims.

The disclosure is based on the idea of driving the in-plane oscillation of the inertial masses in a gyroscope with a piezoelectric transducer placed on the transversal synchronization spring which connects the two inertial masses to each other and synchronizes their anti-phase oscillation movement.

An advantage of the arrangement described in this disclosure is that it ensures that the transversal synchronization spring, which is mechanically in parallel with suspender coated with sense transducers, is very flexible for the sense oscillation mode. In this mode, the transversal synchronization spring experiences a torsional deformation. Almost all sense mode oscillation energy will remain in the suspenders coated with sense transducers, which strengthens the sense signal.

Another advantage of the arrangement described in this disclosure is that, if there is misalignment of the drive transducer on the transversal synchronization spring due to manufacturing imperfections, the drive transducer will still produce no oscillation in the sense oscillation mode. The oscillations arising from linear misalignment will be in a direction which is not sensed by any transducer. A gyroscope with this arrangement will therefore have a very small quadrature component in the sense signal due to misalignment.

Another advantage of the arrangement described in this disclosure is that all suspenders can be dedicated to sensing and that drive transducers can be integrated to an element which was already present in the device, so they do not consume any additional device area.

BRIEF DESCRIPTION OF THE DRAWINGS

In the following the disclosure will be described in greater detail by means of preferred embodiments with reference to the accompanying drawings, in which

FIG. 11 illustrates a gyroscope according to a fifth embodiment.

FIG. 12 illustrates a gyroscope according to a sixth embodiment.

FIG. 13 illustrates a gyroscope according to a seventh embodiment.

FIG. 14a illustrates the bending of a one-sided suspender in out-of-plane oscillation.

DETAILED DESCRIPTION OF THE DISCLOSURE

Figure 2A:
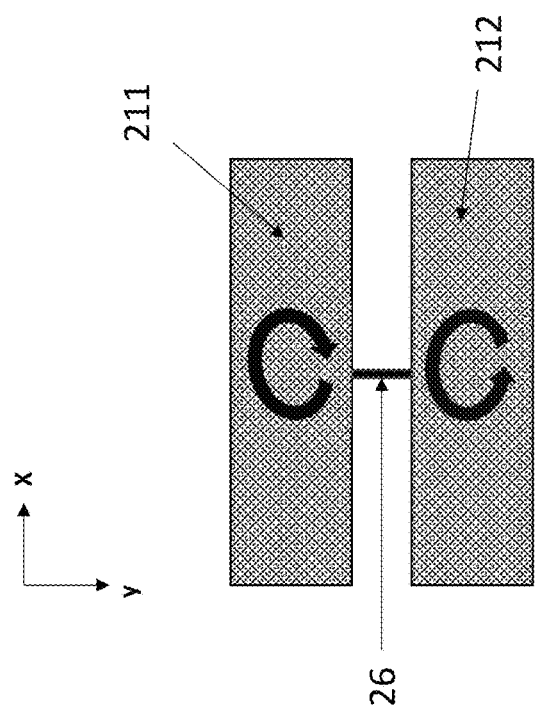
FIGS. 2a and 2b illustrate a gyroscope with two inertial masses in rotational oscillation.
Figure 1:
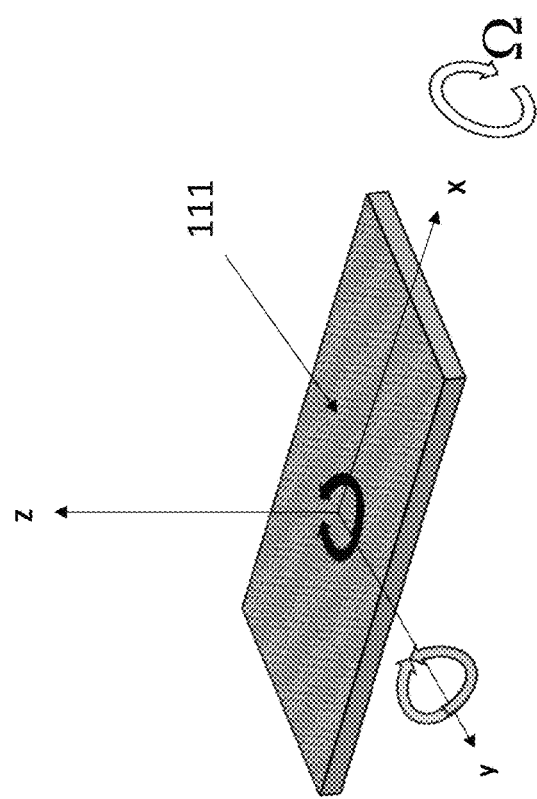
FIG. 1 illustrates an inertial mass in rotational oscillation.
Figure 2B:
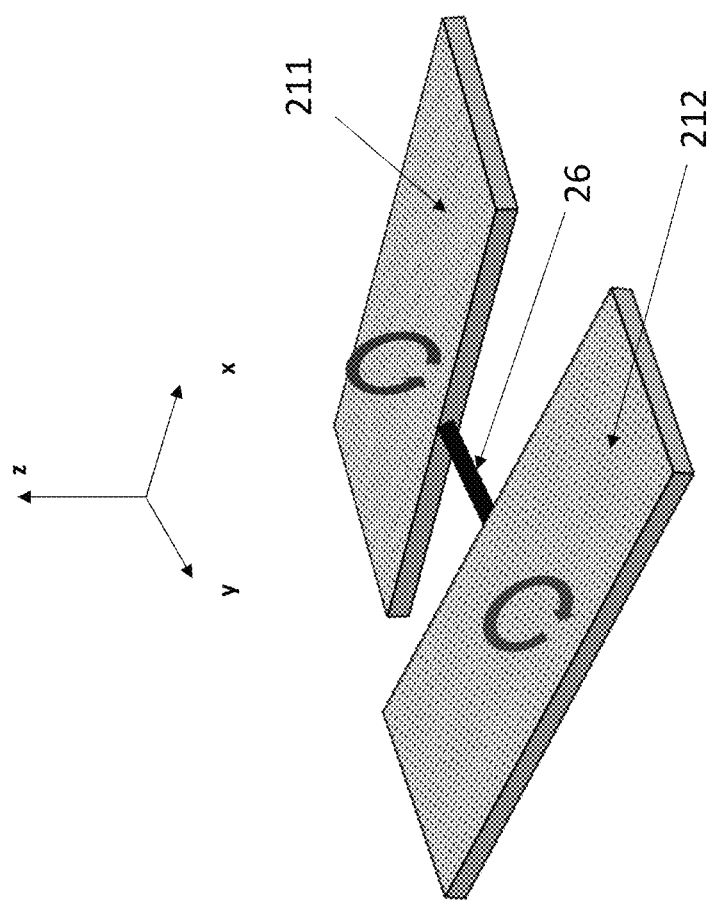

In a gyroscope undergoing angular rotation, the motion of each inertial mass will be a combination of drive oscillation and sense oscillation. If the drive oscillation is in-plane, the sense oscillation will be out-of-plane, and vice versa.

Any flexible structure which is mechanically connected to the mobile inertial mass, and which bends when the mass moves, can in principle be used for transmitting a driving piezoelectric force to the inertial mass, and conversely for sensing the movement of the inertial mass piezoelectrically. A piezoelectric transducer can be formed on a surface of the flexible structure by coating it with electrode layers and a piezoelectric layer, and the transducer can be put into drive operation by connecting it to a voltage or current source, or conversely into sense operation by connecting it to a voltage or current meter. The same piezoelectric transducer may sometimes be used as a drive transducer, and sometimes as a sense transducer. In this disclosure, the transducer may be said to operate in "drive mode" in the former case, and in "sense mode" in the latter case.

In practice, the area of a piezoelectric drive transducer must exceed a certain lower limit to produce a sufficiently strong driving force. But size considerations are even more important for gyroscope sense transducers because the amplitude of the sense oscillation induced by the Coriolis force is weak. A relatively large transducer area is needed to detect it. One way to increase transducer area is to make is to suspend the inertial mass from a fixed base with large but flexible suspenders, and to prepare the piezoelectric transducers on these suspenders.

In this disclosure, a "fixed" object means an object which has a much larger mass than the MEMS gyroscope structure, or alternatively an object which is securely attached to a larger structure and is at least nearly incapable of moving in any direction in relation to this structure by forces presented to it by the MEMS gyroscope. The term "anchor point" is used to refer to a region of a fixed object where partly mobile objects, such as suspenders, may be attached to a fixed object. One end of a suspender may be attached to an anchor point, and the other end may be attached to a mobile inertial mass.

In the silicon-based MEMS applications described in this disclosure, a "suspended" object means an object which is attached to a fixed base only with silicon beams. At least some of these beams are flexible, so that they allow the object to undergo rotational oscillation. Elongated silicon beams can be made flexible enough to be bent or twisted by the movement of an inertial mass if they are suitably dimensioned in relation to the size of the inertial mass. Such flexible beams may be called springs. In piezoelectric gyroscopes, springs should be sufficiently flexible to be bent by the movement of the inertial mass to which they are attached and/or by the piezoelectric transducers placed on top of them.

In this disclosure, the term "suspender" will be used as a general term for beams which attach an inertial mass to a fixed base. This term covers beams which have been dimensioned for flexibility, but also beams whose dimensions prevent them from exhibiting significant flexibility in any direction. In other words, some suspenders are flexible, others are not. Each suspender which has a piezoelectric transducer on top is flexible. Several suspenders with different elastic properties, or sets of suspenders with different elastic properties, may be attached to each other in series, so that they form a chain or a tree of concatenated suspenders. The term "suspension structure" will be used as a general term for systems which may comprise a single suspender extending from an anchor point directly to an inertial mass, or a number of suspenders and optional intermediate bodies which together form a chain or tree structure extending from an anchor point to an inertial mass.

The term "spring" may refer to a suspender, but it may also refer to flexible silicon beams which are not a part of a suspension structure. In particular, the term "spring" may refer to silicon beams which form a part of a synchronization structure connecting two inertial masses to each other, which guides their oscillation. Synchronization structures may or may not be connected to anchor points.

Figure 3:
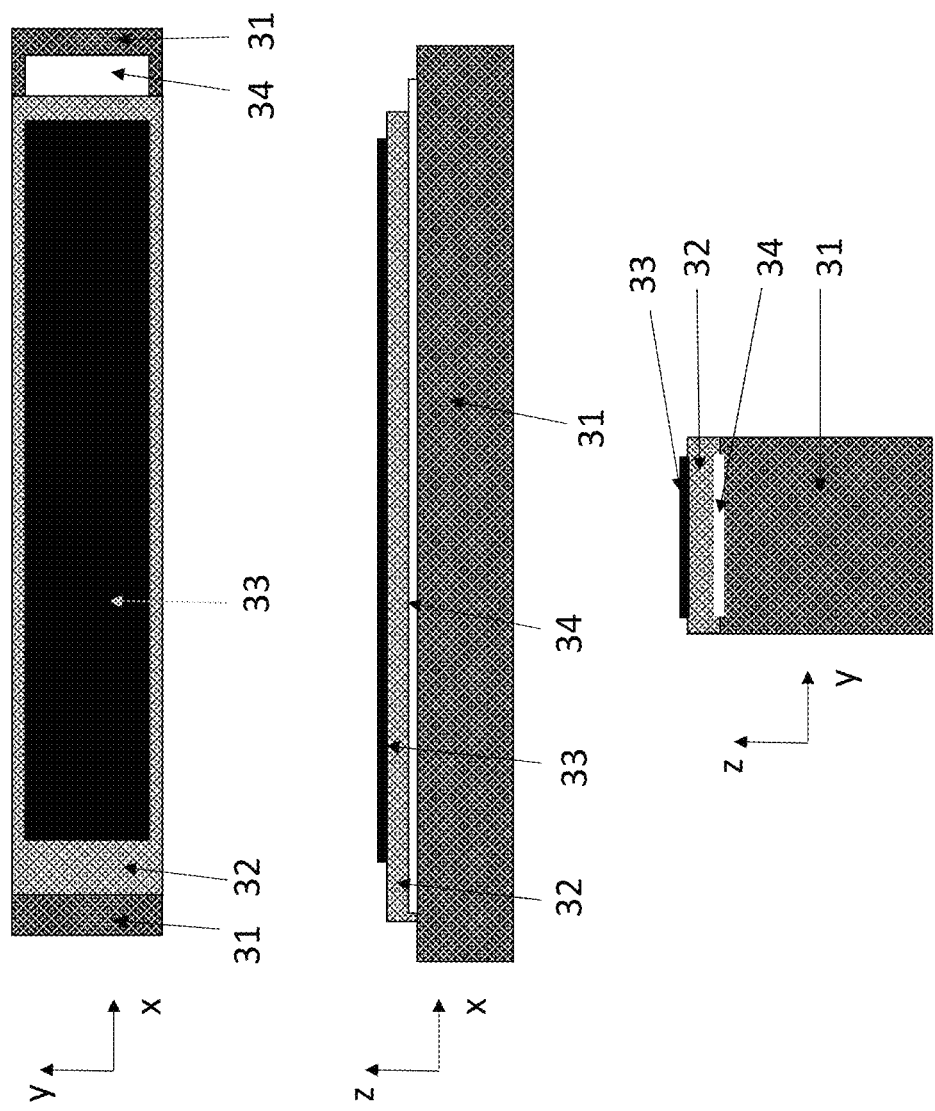
FIG. 3 illustrates a suspender coated with an out-of-plane transducer.

FIG. 3 illustrates three cross-sections of a bending piezoelectric transducer configured for out-of-plane-bending. The transducer includes a layer of piezoelectric material and two electrode layers deposited on a silicon beam 31. The transducer has an oblong shape in the x-y-plane. The transducer includes a bottom electrode layer 34, a layer of piezoelectric material 32 and a top electrode layer 33. The layers 34, 32 and 33 together form a piezoelectric transducer. The silicon beam 31 bends out of the xy-plane when a drive voltage is applied to the electrodes. Conversely, a sense voltage signal can be read from electrode layers 33 and 34 if the suspender 31 is bent out of the xy-plane by an external force.

Figure 4:
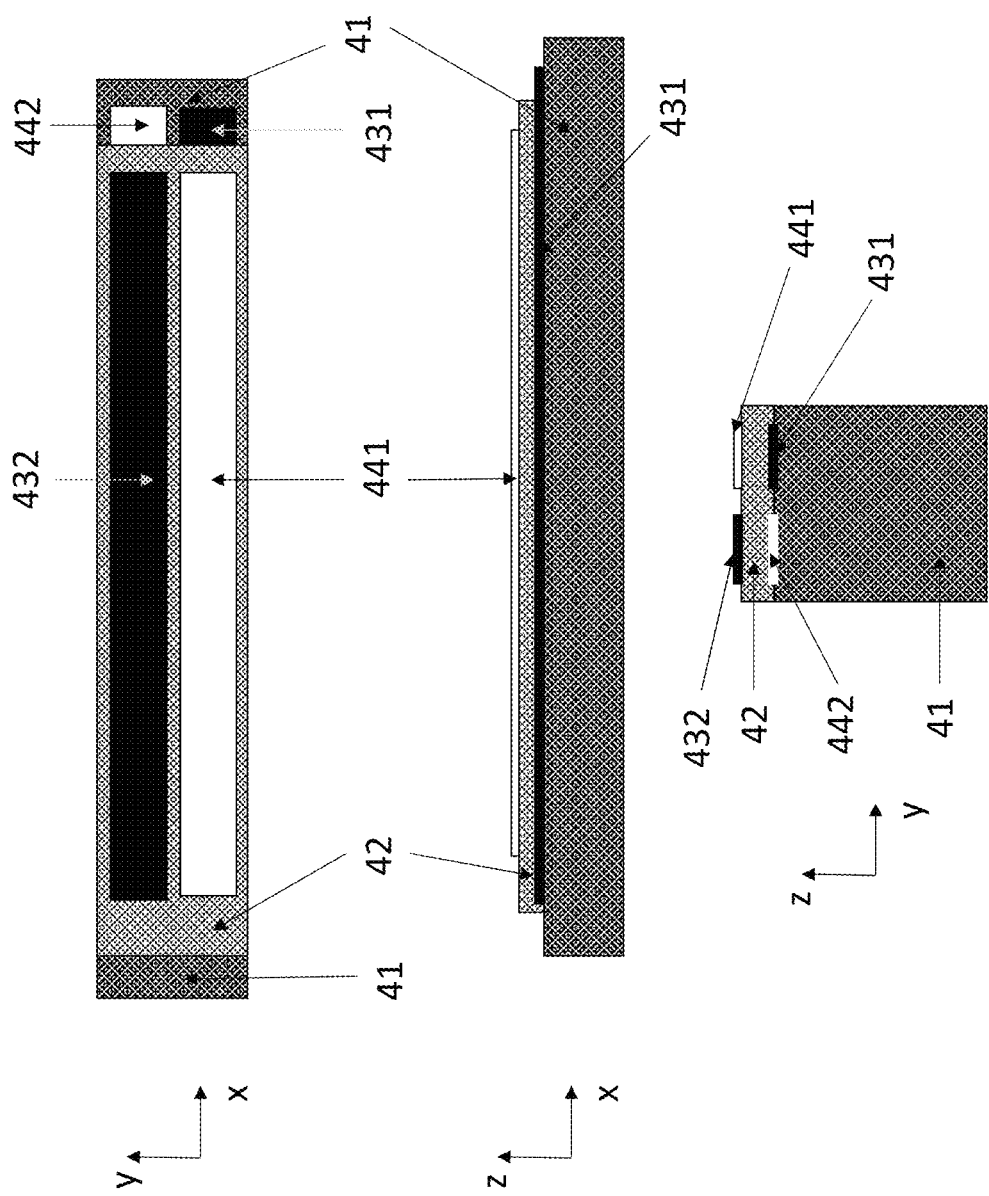
FIG. 4 illustrates a suspender coated with an in-plane transducer.

FIG. 4 illustrates three cross-sections of a bending piezoelectric transducer for in-plane-bending. This transducer includes a silicon beam 41 and a pair of first electrode layers 441 and 442, one on the upper side of the layer of piezoelectric material 42 and one on the lower side (up and down refers in this case to the direction of the z-axis). These electrodes are paired with second electrode layers 431 and 432, respectively, as illustrated in the figure. Layers 441, 42 and 431 together form a first piezoelectric transducer and layers 442, 42 and 432 together form a second piezoelectric transducer.

When drive voltages with opposite polarity are applied to the two transducers, the average y-axis strain is zero, so the transducer does not bend out of the xy-plane. However, the two transducers produce opposite strains in the xy-plane, which bends the silicon beam 41 within this plane. If the transducers are used as sense transducers, in-plane bending will generate a voltage differential between the two transducers, but out-of-plane bending will not.

The drawing conventions in FIGS. 3 and 4 will be employed throughout this disclosure to illustrate transducers for out-of-plane bending and in-plane bending, respectively. In other words, a single rectangle on a suspender will be used to indicate an out-of-plane transducer, while two parallel rectangles of opposite colour on a suspender will be used to indicate an in-plane transducer. These two parallel rectangles will primarily be referred to in the singular, as a single "in-plane transducer", even though the structure is actually a split construction comprising two transducers, as explained above.

Black and white colours indicate polarity on out-of-plane transducers. When both a white out-of-plane transducer and a black out-of-plane transducer are drawn in the same figure, they will actuate the inertial mass in opposite out-of-plane directions if voltages of opposite polarity are applied between their respective top and bottom electrodes. Conversely, opposite voltages can be read from their respective top and bottom electrodes if they are bent in opposite out-of-plane directions. In the case of in-plane transducers, the ordering of the two parallel rectangles indicate polarity, so that the polarity of a transducer with a white rectangle on top (as seen in a figure) is opposite to the polarity of a transducer with a black rectangle on top (as seen in the same figure).

The piezoelectric layer (32, 42), which may be an aluminium nitride (AlN) layer, is typically not thicker than a few micrometers. The thickness of the silicon beam (31, 41) may, for example, be 50 µm.

When piezoelectric transducers described in this disclosure are used in the sense mode, the best signal-to-noise ratios may be achieved when the transducer capacitance equals the sum of the capacitance of the external connections and the input capacitance of the amplifier, which usually amounts to a few pF. The capacitance of the transducer is determined by its area and by the thickness of the piezoelectric layer. It can be shown that if the piezoelectric layer is a 0.8 µm thick AlN layer, then the aspect ratio of the transducer in the xy-plane (in other words, its longitudinal length in the x-direction divided by its transversal width in the y-direction) should be in the range 10-30, preferably in the range 15-25, to achieve transducer capacitances in the range 2-5 pF at typical MEMS resonator frequencies (20-50 kHz) with an inertial mass whose aspect ratio (2-20, preferably 5-10) and thickness (20-50 µm) are in practical ranges. The required transducer area in the xy-plane will be approximately 0.05 mm² to achieve a 5 pF capacitance with a 0.8 μm thick AlN layer. This area may, for example, be obtained with dimensions of 1000 μm×50 μm. The piezoelectric transducers described in this disclosure, and the suspenders on which they are coated, therefore have oblong shapes with aspect ratios in the range 10-30, preferably 15-25.

Those piezoelectric transducers described in this disclosure, which are used as driving transducers, and which are placed on the synchronization spring, should be sufficiently large to produce the required driving force or torque at the lowest possible applied voltage. Limits to the feasible area are posed by manufacturing capability and by the area requirements of the other elements in the gyroscope. The springs coated with drive transducers should have essentially the same spring constant for in-plane rotation of each inertial mass as the suspenders coated with sense transducers have for their out-of-plane rotation.

Figure 7:
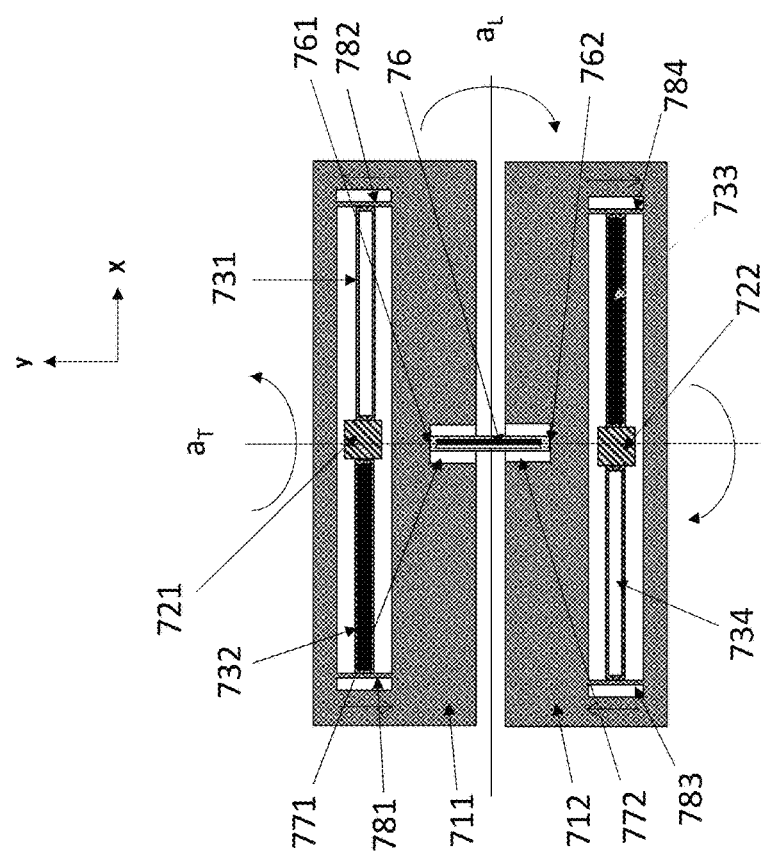
FIG. 7 illustrates a gyroscope according to a first embodiment.

If, for example, the suspenders coated with sense transducers have 50 μm width, 30 μm thickness and 1000 μm length, and if the narrowest in-plane transducer can be 15 μm wide and the thickness of the synchronizing spring is equal to the thickness of the suspenders with sense transducers, then the length of the synchronization spring coated with drive transducers should be 150 μm, which will fit very well to the space between the inertial masses in a straight configuration, as illustrated in FIG. 7 below. However, the transducer will have a low capacitance of only 0.23 pF and thus will require a relatively high voltage for excitation.

Figure 8:
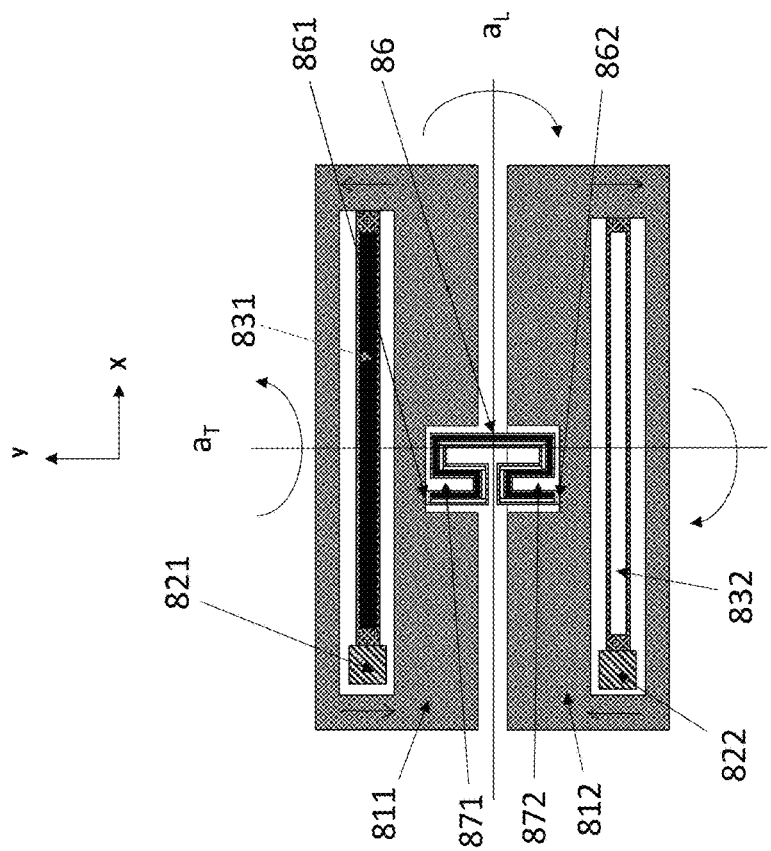
FIG. 8 illustrates a gyroscope according to a second embodiment.

A more practical solution is to make the transducer wider, e.g. 30 μm. Then the length of the synchronization spring should be 1200 μm to achieve the desired spring constant. A spring of this length can still fit in the space between the inertial masses when folded into a meandering shape, as illustrated in FIG. 8. The capacitance of the transducer will then be 3.6 pF, and it will operate at 25% of the voltage required in the previous example, since the voltage scales as the inverse of the square root of the capacitance or area of the transducer.

Optimal dimensions for the driving transducer will also depend on the thicknesses and widths of the suspenders coated with sense transducers. If the suspenders in the example given above would instead be 100 μm wide, then the driving spring could have width/length combinations from 15 μm/75 μm to 38 μm/1200 μm. If the exemplified suspenders would instead be 50 μm thick, then the synchronization spring could have dimensions from 15 μm/54 μm to 42 μm/1200 μm. And if they would be both 50 μm thick and 100 μm wide, then the dimensions of the synchronization spring could range from 15 μm/27 μm to 53 μm/1200 μm.

The size and dimensions of the inertial mass may be chosen more freely because multiple suspenders can be attached to the mass if it is large, as illustrated in this disclosure. The inertial masses depicted in this disclosure also have oblong shapes, but their aspect ratio may be smaller than the aspect ratios of the transducers and suspenders. An inertial mass may have two longitudinal ends on two opposing sides of an anchor point. The longitudinal ends are separated in the x-direction by a longitudinal length. An inertial mass may also have two transversal sides on two opposing sides of an anchor point, separated in the y-direction by a transversal width. However, in some embodiments the inertial mass may be asymmetric, so that it only has one transversal side on one side of the anchor point and an opening on the other side.

Figure 6:
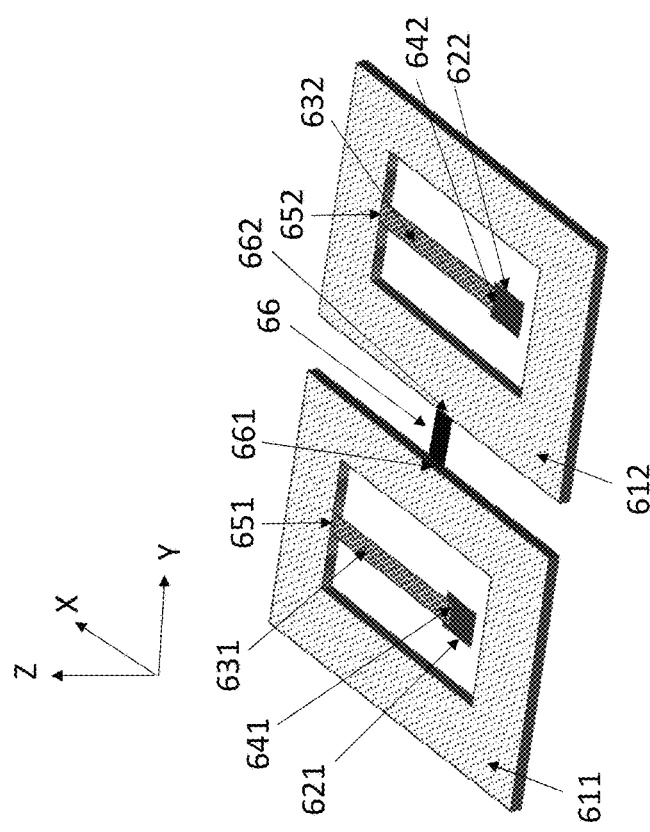
FIG. 6 illustrates a gyroscope with frame-shaped inertial masses and one-sided suspension.
Figure 5:
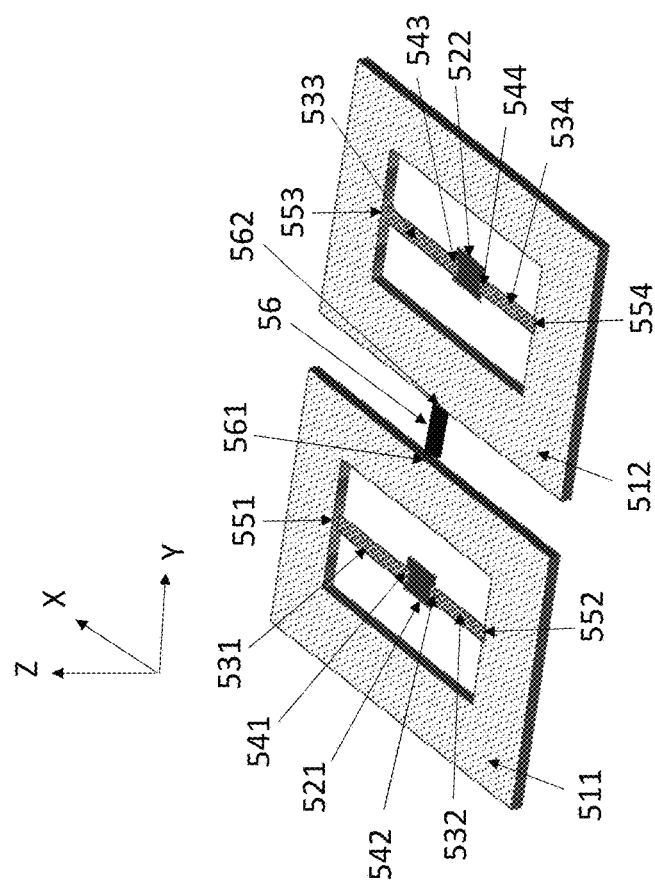
FIG. 5 illustrates a gyroscope with frame-shaped inertial masses and two-sided suspension.

FIG. 5 illustrates a gyroscope with two frame-shaped, centrally suspended inertial masses 511 and 512. Each inertial mass 511, 512 has a central opening where a fixed anchor point 521, 522 is located. Each inertial mass 511, 512 is in this case suspended from the anchor point 521, 522 by a pair of suspenders 531+532, 533+534. One end of each suspender 531-534 is attached to the anchor point 521, 522 at its first attachment point 541-544 and the other end is attached to the inertial mass 511, 512 at its second attachment point 551-554. The suspenders 531-534 may be at least partially coated with piezoelectric transducers which can generate in-plane and/or out-of-plane oscillation. Electrical contacts may be drawn to these transducers for example through the anchor points 521 and 522, or through separate loose springs dedicated for this purpose. The width and length of suspenders 531-534 allows relatively large transducers to be manufactured on their surfaces. A synchronization spring 56 couples the two inertial masses 511 and 512 to each other. A first end of the synchronization spring 56 is attached to inertial mass 511 at a first attachment point 561, and a second end of the synchronization spring 56 is attached to inertial mass 512 at a second attachment point 562. FIG. 6 also illustrates a gyroscope with two frame-shaped, centrally suspended inertial masses 611 and 612. In this gyroscope, each inertial mass 611 and 612 is suspended from only one longer suspender 631 and 632. A synchronization spring 66 couples the two inertial masses 611 and 612 to each other.

In the gyroscopes illustrated in FIGS. 5 and 6, any suspender (531-534 and 631-632) can be dedicated either for driving the inertial masses into their primary motion (which may be either in-plane rotation or out-of-plane rotation) or for sensing the secondary motion (which will be out-of-plane rotation if the primary motion is in-plane rotation, and vice versa) which arises if the gyroscope experiences angular rotation. Each suspender can de dedicated for its intended function by preparing on it a piezoelectric transducer suitable for driving or detecting the intended motion.

It is possible to prepare gyroscopes where the geometry of one inertial mass differs from the geometry of the other inertial mass, or where the geometry of the suspension structure which suspends one inertial mass from an anchor point differs from the geometry of the suspension structure which suspends the other inertial mass from an anchor point. However, if these geometries differ, it can be a fairly complex practical problem to ensure that the inertial masses obtain the same resonance frequencies.

Symmetrical mass and suspender geometries on the two sides of a gyroscope make it much easier to equalize the resonance oscillation. All suspenders in piezoelectric gyroscopes are therefore typically aligned in parallel. In other words, although it could in theory be possible to orient suspenders 533 and 534 in the transversal y-direction in FIG. 5 while keeping suspenders 531 and 532 oriented in the longitudinal x-direction, this is not a viable option in practice because the resonance modes of the two masses 511 and 512 would not be the same after that change in alignment.

When all suspenders are aligned in the same direction, they will undergo the same drive oscillation when drive transducers are actuated, and also undergo the same sense oscillation when the gyroscope experiences angular rotation. A suspender which is coated with an out-of-plane drive transducer, for example, will experience the same in-plane oscillation as another suspender in the same system which is coated with an in-plane sense transducer.

The deformation which occurs in a suspender due to drive oscillation is perfectly orthogonal to the deformation which occurs in the same suspender due to sense oscillation only if the suspender has the shape of a square prism, where the thickness and width of the suspender remain constant and equal along the entire length of the suspender. But a perfect square prism is difficult to achieve due to finite manufacturing tolerances. Suspenders often obtain slightly tilted profiles where the side wall is not strictly orthogonal with respect to the top and bottom surfaces. The drive and sense oscillation modes of such suspenders will not be perfectly orthogonal in this case. Another potential source of error is that the sense transducer may not be perfectly aligned with the central axis of its suspender, which makes slightly responsive also to the drive oscillation.

If a suspender coated with an in-plane drive transducer, for example, does not have the shape of a perfect square prism, it may, in addition to driving the inertial mass into the intended in-plane oscillation, simultaneously drive the inertial mass into out-of-plane oscillation. The amplitude of this out-of-plane oscillation may be small in comparison to the in-plane oscillation, but even small out-of-plane components can be serious because the drive oscillation amplitude is typically several orders of magnitude larger than the coupled sense oscillation amplitude at practical angular rotation rates, which may range from 0.1 degrees/second to 300 degrees/second in automobile applications, for example. The amplitude ratio of a gyroscope is $2*\Omega/\omega$, where $\Omega$ is the rotation rate and $\omega$ is the angular frequency of the resonance. The sense oscillation amplitude range is thus from $2*10^{-8}$ to $6*10^{-5}$ times the drive oscillation amplitude. In practice, it is desirable to bring the deviation to $10^{-4}$ or less, since the remaining deviation can be compensated by electrical means. The ratio $10^{-4}$ is very difficult, if not impossible, to achieve by manufacturing control due to vertical angle tilt in etched suspenders and misalignment of the transducers on the suspenders.

In other words, deviations from perfect orthogonality will produce a direct coupling from the drive oscillation to the detected sense signal, which may completely mask the much smaller coupled signal due to sense oscillation. The sense signal component arising from directly coupled drive oscillation will have the same phase as the drive oscillation, whereas the sense signal arising from angular rotation will exhibit a 90-degree phase shift in relation to the drive oscillation. The sense signal component arising from directly coupled drive oscillation is called a quadrature component. By phase sensitive detection, the true sense signal caused by angular rotation can be filtered from the signal measured from the sense transducer(s). But if the sense signal component due to directly coupled drive oscillation is very large, it will cause overloading of the amplifier, and the separation of the in-phase signal from the total signal may not be perfect due to phase errors in phase sensitive detection. It is therefore desirable to render the directly coupled signal as small as possible.

If sense and drive transducers are placed on suspenders 531-534 and 631-632 in the configurations illustrated in FIGS. 5-6, the coupling of drive oscillation into the sense signal is difficult to avoid. If, for example, the drive oscillation is in-plane oscillation, the suspenders which are coated with drive transducers would have to be very narrow in the transversal direction and short in the longitudinal direction in order to be stiff in out-of-plane oscillation. But it is difficult to manufacture an in-plane transducer on a very small area, and the high impedance level of a small transducer limits the magnitude of the driving force which can be generated by the transducer.

However, these problems can be avoided if the synchronization springs 56 and 66 can be dedicated for driving the in-plane motion of the inertial masses to which they are attached. The synchronization springs 56 and 66 are oriented in the transversal direction, as shown in FIGS. 5 and 6. If the dimensions of the synchronization spring are sufficiently large, so that a piezoelectric transducer with enough surface area to drive the two masses can be prepared on the synchronization spring, the bending of the synchronization spring can drive the two inertial masses into anti-phase, in-plane drive oscillation.

The anti-phase, out-of-plane sense oscillation induced by the Coriolis force in the inertial mass produces a torsional twist in the synchronization springs 56 and 66. The twisting mode spring of these springs is in parallel with the out-of-plane springs 531-534 and 631-632, respectively. The twisting mode spring constant of 56 or 66 can be easily designed to be small in comparison with the total out-of-plane spring constant of the suspenders 531-534 or 631-632. This ensures that the twisting synchronization springs 56 and 66 do not essentially influence the out-of-plane oscillation of the inertial masses, and that only a small portion of the out-of-plane oscillation energy is contained in the synchronization spring 56 or 66.

In a conventional gyroscope, the in-plane bending mode spring constant of the synchronizing spring 56 or 66 is made small in comparison with the in-plane spring constants of the suspenders 531-534 or 631-632, so that the synchronizing spring doesn't influence the in-plane oscillation of the inertial masses.

This disclosure describes a microelectromechanical gyroscope comprising a substrate a substrate which defines a device plane and comprises one or more first anchor points and one or more second anchor points, and a first inertial mass and a second inertial mass. The first inertial mass is suspended from the one or more first anchor points by a first suspension structure configured to allow the first inertial mass to oscillate rotationally both in the device plane and out of the device plane. The second inertial mass is suspended from the one or more second anchor points by a second suspension structure configured to allow the second inertial mass to oscillate rotationally both in the device plane and out of the device plane.

At least one of the first and second suspension structures comprises one or more suspenders coated with piezoelectric transducer structures configured to detect oscillating motion out of the device plane by the inertial mass to which the suspension structure is attached.

The gyroscope also comprises a synchronization structure which includes a synchronization spring attached to the first inertial mass at a first attachment point and to the second inertial mass at a second attachment point. The synchronization spring is coated with a piezoelectric transducer structure configured to drive the first and the second inertial masses into anti-phase drive oscillation in the device plane.

A suspension structure, as defined in this disclosure, is a body of silicon positioned between an anchor point and an inertial mass. Although the suspension structure is always a unitary body of silicon, different regions of the suspension structure can be formed so that they differ from each other in terms of their length, width, and/or thickness.

First Embodiment

FIG. 7 illustrates a gyroscope according to a first embodiment. The gyroscope comprises a first anchor point 721 and a second anchor point 722. A first inertial mass 711 is suspended from the first anchor point 721 by a first suspension structure which includes two suspenders 731 and 732 that extend in opposite longitudinal directions from the first anchor point 721. A second inertial mass 712 is suspended from the second anchor point 722 by a second suspension structure which includes two suspenders 733 and 734 that extend in opposite longitudinal directions from the second anchor point 721. The two opposing suspenders in each suspension structure have been covered with out-of-plane transducers of different polarity, configured to detect oscillating motion out of the device plane by the inertial mass.

The gyroscope also comprises a synchronization structure where the coated synchronization spring is a straight spring 76 aligned with the transversal symmetry axis of the gyroscope. The spring 76 is attached to the first inertial mass 711 at a first attachment point 761, and to the second inertial mass 712 at a second attachment point 762. These attachment points can be located at the edges of the respective inertial masses. Alternatively, as illustrated in FIG. 7, the attachment points 761 and 762 may be located in small cavities 771 and 772 formed in inertial masses 711 and 712. The first attachment point 761 may lie in a first cavity 771 in the first inertial mass 711, and the second attachment point 762 may lie in a second cavity 772 in the second inertial mass 712. The synchronization spring 76 may lie partly within the first cavity 771 and partly within the second cavity 772. In other words, one end of the synchronization spring 76 is in the first cavity 771, the other end is in the second cavity 772, and the middle part of the synchronization spring is in the open region between the first and second inertial masses 711 and 712. The cavities 771 and 772 facilitate the use of a longer synchronization spring 76 without increasing the breadth of this open region. A stronger driving force can thereby the imparted to the inertial masses without increasing the area of the gyroscope.

The gyroscope in FIG. 7 has a transversal symmetry axis $a_T$ and a longitudinal symmetry axis $a_L$. The synchronization spring 76 may lie on the transversal symmetry axis.

When an alternating drive voltage is applied to the piezoelectric transducer structure on synchronization spring 76, it drives the inertial masses 711 and 712 into anti-phase oscillation when the spring bends along its transversal lengthwise direction. The midpoint of the synchronization spring 76, which lies at the intersection of the transversal and longitudinal symmetry axes $a_T$ and $a_L$ in the rest position shown in FIG. 7, moves alternately to the left and right of the transversal symmetry axis when the transducer bends the spring. This causes the inertial masses 711 and 712 to rotate in the device plane in the anti-phase mode which was illustrated in FIG. 2a above.

Advantageously, the first and second suspension structures may be significantly more flexible for in-plane bending than the synchronization spring 76 is. In this case the stiffness of the entire system of springs and suspenders for in-plane oscillation is determined essentially by the synchronization spring 76, and the torque generated by the piezoelectric transducer on the spring 76 is not counteracted by spring forces from the suspension structures. Larger drive oscillation amplitudes can thereby be reached with the same applied voltage. These considerations apply in all subsequent embodiments as well.

Second Embodiment

FIG. 8 illustrates a gyroscope according to a second embodiment. The gyroscope comprises a first anchor point 821 and a second anchor point 822. A first inertial mass 811 is suspended from the first anchor point 821 by a first suspension structure which includes one suspender 831 which extends in a longitudinal direction from the first anchor point 821. A second inertial mass 812 is suspended from the second anchor point 822 by a second suspension structure which includes one suspender 832 which extends in a longitudinal direction from the second anchor point 821. Suspenders 831 and 832 have been covered with out-of-plane transducers of different polarity, configured to detect oscillating motion out of the device plane.

The gyroscope also comprises a synchronization structure where the coated synchronization spring is a meandering spring 86. The meandering synchronization spring is attached to the first inertial mass 811 at a first attachment point 861, and to the second inertial mass 812 at a second attachment point 862. These attachment points can be located at the edges of the respective inertial masses. Alternatively, as illustrated in FIG. 8, the attachment points 861 and 762 may be located in cavities 871 and 872, as described in the first embodiment. As explained above, a drive transducer coated on a synchronization spring with this longer, meandering shape can be actuated with a lower actuation voltage than a drive transducer on the straight synchronization spring illustrated in FIG. 7.

The gyroscope in FIG. 8 has a transversal symmetry axis $a_T$ and a longitudinal symmetry axis $a_L$. The optimal position of the meandering synchronization spring in relation to the transversal symmetry axis depends on the dimensions of the spring and one the spacing between the meanders. The operating principle of the meandering synchronization spring 86 is the same as that of the straight synchronization spring 76 described in the first embodiment, although the bending motion is a bit more complex. The spring 86 causes the inertial masses 811 and 812 to rotate in the device plane in the anti-phase mode which was illustrated in FIG. 2a above.

The straight synchronization spring 76 was illustrated in FIG. 7 in the first embodiment in a gyroscope with two-sided suspension structures, as in FIG. 5. The meandering synchronization spring 86 was illustrated in FIG. 8 in a gyroscope with one-sided suspension structures, as in FIG. 6. However, either of the synchronization spring geometries presented in the first and second embodiments can be combined with either type of suspension structure, and either of these geometries can be used in all subsequent embodiments presented in this disclosure. Only a straight spring will be illustrated in the subsequent figures to avoid unnecessary duplication. Other synchronization spring geometries which allow the spring to exhibit desired flexibility in the in-plane direction and higher flexibility in the out-of-plane direction can also be used.

Third Embodiment

In all embodiments presented in this disclosure, each suspension structure is, as a whole, sufficiently flexible to allow its inertial mass to oscillate rotationally both in the device plane and out of the device plane. The suspension structure is configured to allow rotational oscillation in both directions by ensuring that it is sufficiently flexible. However, flexibility in a given direction (in-plane or out-of-plane) may be located in just one part of a suspension structure. For example, a first part of a suspension structure may be flexible for out-of-plane bending, while a second part of the same suspension structure may not be flexible for out-of-plane bending. The out-of-plane deformation which occurs in the suspension structure will in this case take place only in the first part. The second part will move along in out-of-plane motion as a rigid extension of the first part, but it may not undergo any out-of-plane bending. The same situation can obtain in in-plane bending. The roles of the first and second parts of the suspension structure may then be reversed, so that the first remains rigid but the second bends. In other words, suspension structures can be configured to allow the inertial masses to oscillate rotationally, without necessarily having uniform in-plane and out-of-plane flexibility in all parts of the suspension structure. In-plane flexibility can be prepared in some parts of the suspension structure, out-of-plane flexibility in other parts.

When the in-plane drive transducer which sets the inertial masses into drive oscillation is placed in the synchronization structure, as shown in the preceding embodiments, the suspension structure can be designed exclusively for measuring the sense oscillation, Drive transducer requirements no longer restrict the design of the suspension structure. In other words, when the drive transducer is placed in the synchronization structure, new suspension structure arrangements can be used. Nevertheless, this does not mean that the flexibility of the suspension structure in in-plane oscillation can be disregarded. Each suspension structure must contain some parts which conform flexibly to the in-plane oscillation of the inertial mass. Drive oscillation would otherwise be prevented by the suspension structure.

In the preceding embodiments, the in-plane flexibility was provided by the suspenders containing the transducers for detecting the out-of-plane oscillations. If there is a small deviation from exact orthogonality between the side wall and the top and bottom surfaces in these suspenders, or if the transducer is slightly misaligned from the center line of the suspender, then the transducer will produce an undesired signal due to in-plane oscillation, in addition to the desired signal due to out-of-plane oscillation. In gyroscope contexts, this undesired signal is called a quadrature signal, because it has a 90 degree phase shift to the desired signal induced by the Coriolis force. The third, fourth, fifth and sixth embodiments presented below describe concatenated suspensions, where in-plane flexibility and out-of-plane sensing can be separated to different parts of the suspension structure.

In this disclosure, regions of a suspension structure whose flexible properties differ from each other are understood to constitute separate suspenders. In other words, a suspension structure may comprise multiple suspenders connected in series or parallel, optionally with an intermediate body in between. The suspension structure may comprise just one chain of suspenders connected to each other, or several chains which branch outward from the anchor point to the inertial mass.

A suspension structure may comprise a set of first suspenders with suspenders which are significantly less flexible in a first direction orthogonal to the longitudinal symmetry axis than they are in a second direction which is orthogonal to both the longitudinal symmetry axis and the first direction. The suspenders in this first set may be concatenated with suspenders from a set of second suspenders, where the second suspenders are significantly less flexible in the second direction than in the first. In other words, the sets of first and second suspenders may exhibit flexibility in directions which are orthogonal to each other and orthogonal to the longitudinal symmetry axis of the gyroscope.

The third, fourth, fifth, and sixth embodiments describe microelectromechanical gyroscopes utilizing any of the synchronization structures described in the preceding embodiments. In these gyroscopes, at least one suspension structure comprises a set of first suspenders comprising one or more first suspenders arranged so that the in-plane spring constant of the set of first suspenders is configured to be smaller than its out-of-plane spring constant. The suspension structure further comprises a set of second suspenders comprising one or more second suspenders coated with piezoelectric transducer structures which are configured to detect oscillating motion out of the device plane by the inertial mass to which the suspension structure is attached, wherein the out-of-plane spring constant of the set of second suspenders is configured to be smaller than its in-plane spring constant. The set of first suspenders and the set of second suspenders are concatenated in the at least one suspension structure.

In this disclosure, the term "concatenated" has the following meaning. A set of one or more first suspenders is concatenated with a set of one or more second suspenders if it is possible to traverse the suspension structure from at least one anchor point to the inertial mass by first traversing any of the first suspenders, and then traversing any of the second suspenders (without having to return back across the first suspender which has already been traversed). The order may be reversed, so that the second suspender lies closer to the anchor point and is traversed first, followed by a traversal of any of the first suspenders. An intermediate body may be located and traversed in between the first and second suspenders.

In other words, the first set of suspenders is concatenated with the second set of suspenders if, for each suspender in each set, there exists a route (with no back and forth movement across one suspender) from at least one anchor point to the inertial mass which comprises that suspender and any suspender from the other set. Intermediate bodies which belong to neither the first set nor the second set may be connected between the first suspenders and the second suspenders. Intermediate bodies may, in particular, facilitate branching of the suspension structure into multiple parallel structures, as will be described in more detail below.

In other words, in the case where first suspenders are closer to an anchor point, a suspension structure may comprise one or more first suspenders whose first end is connected to the anchor point. The second ends of these first suspenders may be connected to the first ends of one or more second suspenders. The second ends of these second suspenders may be connected to the inertial mass. Alternatively, the concatenated structure may be as described above, except that the second ends of the first suspenders may be connected to an intermediate body, and the first ends of the second suspenders may be connected to the same intermediate body. The intermediate body may be a branching structure which allows the number of second suspenders to be greater than the number of first suspenders.

Figure 9:
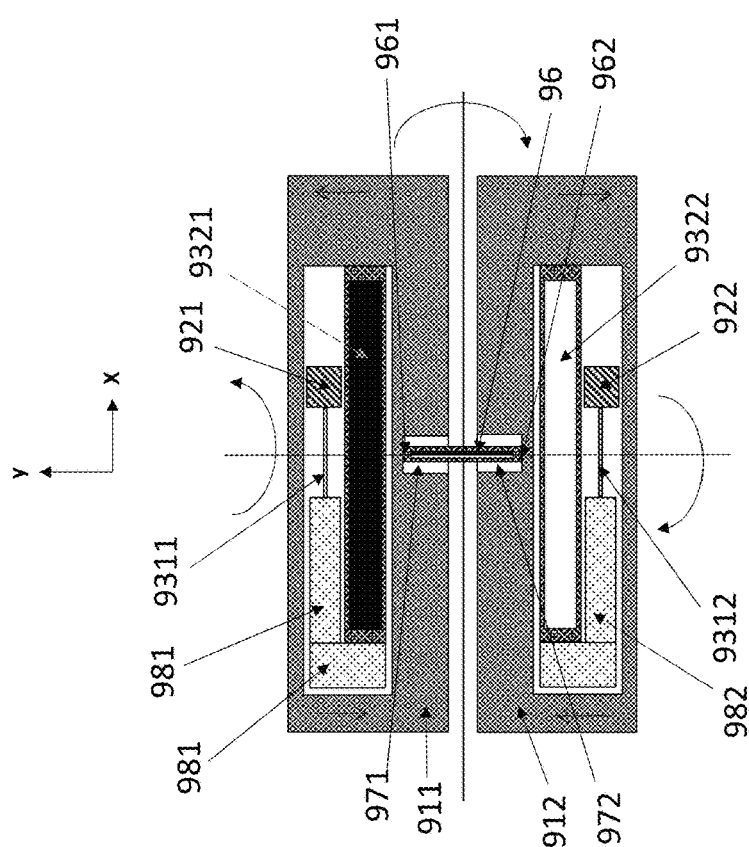
FIG. 9 illustrates a gyroscope according to a third embodiment.

FIG. 9 illustrates a gyroscope where reference numbers 911, 912, 921, 922, 96, 961, 962, 971 and 972 illustrate the same elements as 711, 712, 721, 722, 76, 761, 762, 771 and 772 in FIG. 7. The synchronization spring 96 operates in the manner described in the first embodiment, and it may be replaced with the meandering synchronization spring described in the second embodiment.

The suspension structure of first inertial mass 911 will be described in more detail. The suspension structure of the second inertial mass 912 does not necessarily have to be identical to the suspension structure of the second inertial mass 912, but the symmetrical arrangements illustrated in all figures of this disclosure are typically the easiest way of ensuring that both inertial masses obtain the same resonance modes.

In the illustrated gyroscope, the set of first suspenders comprises one first suspender 9311 and the set of second suspenders comprises one second suspender 9321. The set of first suspenders and the set of second suspenders are concatenated in parallel via a U-turn intermediate body 981, so that the first suspender 9311 extends in a first longitudinal direction along a first longitudinal axis from the anchor point to the intermediate body, and the second suspender 9321 extends in the opposite longitudinal direction along a second longitudinal axis from the intermediate body to the inertial mass.

The first suspender 9311 is very narrow, and therefore very flexible for in-plane bending. When the inertial mass oscillates, in-plane bending will therefore primarily take place in this suspender. The second suspender 9321 is coated with an out-of-plane transducer. The thickness of the first suspender 9311 may be equal to the thickness of the second suspender. However, the U-shaped intermediate body allows the first suspender 9311 to be shorter than the second suspender 9321. If the length difference is considerable, as in FIG. 9, the first suspender 9311 becomes significantly stiffer for out-of-plane bending than second suspender 9321, so out-of-plane bending will primarily take place in the second suspender 9321. It may be noted that shortening the first suspender 9311 also reduces its in-plane flexibility. The optimal length of this suspender depends on the desired in-plane and out-of-plane flexibilities, and it depends on the size of the inertial mass and on the flexibility properties of the other parts in the suspension structure.

The intermediate body 981 is a U-turn intermediate body, shaped like the letter L, which allows the path which traverses the suspension structure to make a 180° turn. The parts which constitute the intermediate body 981 have relatively small aspect ratios, as illustrated in FIG. 9. This makes them stiff for both in-plane and out-of-plane bending. One end of the first suspender 9311 is attached to the anchor point 921 and the other is attached to the L-shaped intermediate body 981. One end of second suspender 9321 is attached to the intermediate body 981, the other to the inertial mass 911. The first and second suspenders thereby extend in opposite longitudinal directions along two parallel longitudinal axes.

In order to quantify the differences in flexible properties which should obtain between suspenders in the first and the second sets of suspenders, it may be noted that each set may comprise suspenders connected both in series and in parallel. In this disclosure, each set of suspenders is treated as a whole, so that each set of suspenders is characterized by one in-plane spring constant and one out-of-plane spring constant. The combined spring constants of any given set of suspenders can be calculated when the spring constants of each suspender in the set and the geometry of the suspension structure is known.

In this disclosure, the term "in-plane spring constant" refers to the proportionality coefficient between (1) the angle of rotation of an inertial mass about a vertical axis, and (2) the restoring force by which a given set of suspenders in its suspension structure acts on the inertial mass. In other words. Conversely, the term "out-of-plane spring constant" refers to the proportionality coefficient between (1) the angle of rotation of an inertial mass about a transversal axis, and (2) the restoring by which a given set of suspenders in its suspension structure acts on the inertial mass.

The resonance frequency f of an inertial mass in rotational oscillation about a rotation axis is:

$$f = \frac{1}{2\pi}\sqrt{\frac{k}{L}}$$

where k is the spring constant for that rotational motion and L is the moment of inertia of the inertial mass in relation to that rotation axis. The moment of inertia of an inertial of an inertial mass in relation to its transversal symmetry axis (out-of-plane rotation axis) is equal to its moment of inertia in relation to its vertical symmetry axis (in-plane rotation axis). Since the in-plane and out-of-plane resonance frequencies should preferably be equal or nearly equal, the spring constant of the suspension structure for in-plane oscillation should preferably be equal or nearly equal to the spring constant of the suspension structure for out-of-plane oscillation.

When a suspension structure comprises a first set of suspenders concatenated (optionally through an intermediate body) with a second set of suspenders a described above, the in-plane spring constant of the entire suspension structure should preferably be determined by the first set of suspenders, which is configured to be significantly more flexible in in-plane bending. Conversely, the out-of-plane spring constant of the entire suspension structure should preferably be determined by the second set of suspenders, which is configured to be significantly more flexible in out-of-plane bending. This situation may be obtained by making the out-of-plane spring constant of the first set of suspenders ($k_{OP1}$) significantly larger than both the out-of-plane spring constant of the second set of suspenders ($k_{OP2}$) and the in-plane spring constant of the first set of suspenders ($k_{IP1}$). Conversely, the in-plane spring constant of the second set of suspenders ($k_{IP2}$) may be significantly larger than both the in-plane spring constant of the first set of suspenders ($k_{IP1}$) and the out-of-plane spring constant of the second set of suspenders ($k_{OP2}$).

Assuming that drive oscillation is implemented as in-plane oscillation and sense oscillation as out-of-plane oscillation, an appreciable reduction in the quadrature component in the sense signal may be achieved already with spring constant ratio which falls within the range $k_{IP2}/k_{IP1}=3 \ldots 10$. However, it may be preferable to make the spring constant ratio $k_{IP2}/k_{IP1}$ much larger, even as large as possible, which may put it in the range $10 \ldots 100$, to really minimize the quadrature component.

Continuing the above example, which also applies to the fourth, fifth, sixth and seventh embodiments presented below, a considerable increase in the sense signal may be achieved when $k_{OP1}/k_{OP2}=2 \ldots 10$, because this prevents coupled energy from being lost in the first set of suspenders. Increasing the spring constant ratio $k_{OP1}/k_{OP2}$ further will not improve the sense signal much, because the ratio $k_{OP1}/k_{OP2}=10$ is already sufficient to bring the signal amplitude to within 95% of its maximum value. It may in some applications be feasible to accept the ratio $k_{OP1}/k_{OP2}=1$, and only take the benefit of reducing the quadrature signal by a large $k_{IP2}/k_{IP1}$-ratio. This simpler option may sometimes be preferable due to the design constraints which must be met for both ratios to be maximized.

A rotational spring constant of a beam-shaped suspender is proportional to $a^3b/L$, where a is the width of the suspender for in-plane oscillation and thickness of the suspender for out-of-plane oscillation, b is the thickness of the suspender for in-plane oscillation and width of the suspender for out-of-plane oscillation and L is the length of the suspender. An exemplary design where $W_2/W_1=8$ and $L_2/L_1=64$ ($W_1$ and $W_2$ are the widths of the first and second suspenders and $L_1$ and $L_2$ their lengths) will result in both ratios $k_{IP2}/k_{IP1}$ and $k_{OP1}/k_{OP2}$ being equal to 8, which will satisfy both requirements and which is a realistic design.

Fourth Embodiment

Figure 10:
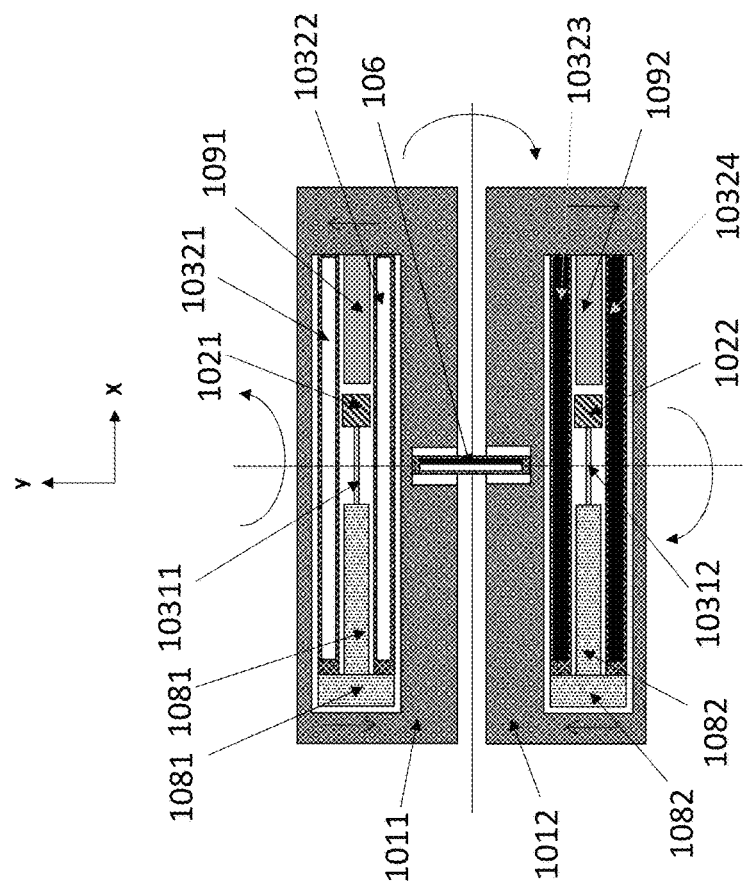
FIG. 10 illustrates a gyroscope according to a fourth embodiment.

FIG. 10 illustrates a gyroscope where reference numbers 1011, 1012, 1021, 1022 and 106 again illustrate the same elements as 711, 712, 721, 722 and 76 in FIG. 7. The synchronization spring 106 operates in the manner described in the first embodiment, and it may be replaced with the meandering synchronization spring described in the second embodiment.

The suspension structure of first inertial mass 1011 will be described in more detail, as in the third embodiment.

In the illustrated gyroscope, the set of first suspenders comprises one first suspender 10311 and the set of second suspenders comprises two second suspenders 10321 and 10322, and the set of first suspenders and the set of second suspenders are concatenated in parallel via a double U-turn intermediate body 1081, so that the first suspender 10311 extends in a first longitudinal direction, along a first longitudinal axis, from the anchor point 1021 to the intermediate body 1081, and both of the second suspenders 10321 and 10322 extend in the opposite longitudinal direction from the intermediate body 1081 to the inertial mass 1011 along second and third longitudinal axes.

As in the third embodiment, the first suspender 10311 is very narrow. The two second suspenders 10321 and 10322 are coated with out-of-plane transducers. The thickness of the first suspender 10311 may be equal to the thickness of the second suspenders 10321 and 10322. The T-shaped intermediate body allows the first suspender 10311 to be shorter than the second suspenders 10321 and 10322. If the length difference is considerable, as in FIG. 10, the first suspender 10311 becomes significantly stiffer for out-of-plane bending than second suspender 10321 and 10322, so out-of-plane bending will primarily take place in the second suspenders. As in the third embodiment, the optimal length of this suspender depends on the desired in-plane and out-of-plane flexibilities, and on the size of the inertial mass and on the flexibility properties of the other parts in the suspension structure. The decrease of the quadrature signal is not determined solely by the ratio of the widths of the second and first suspenders, but also by the ratio of the distance between the two second suspenders and the width of the first suspender. This makes it much easier to achieve high ratios between the in-plane spring constants. The inertial mass 1011 may optionally comprise a protrusion 1091 which extends in a longitudinal direction between the two second suspenders 10321 and 10322, towards (but not to) the anchor point.

The intermediate body 1081 is a double U-turn intermediate body, shaped like the letter T, which allows the path which traverses the suspension structure to make a 180° turn in two different directions. As in the third embodiment, the parts which constitute the intermediate body 1081 have relatively small aspect ratios, which makes them stiff for both in-plane and out-of-plane bending. One end of the first suspender 10311 is attached to the anchor point 1021 and the other is attached to the base of the T-shaped intermediate body 1081. Second suspenders 10321 and 10322 are attached from one end to one of the opposing top ends of the T-shaped intermediate body 1081, and from their other end to the inertial mass 1011.

Fifth Embodiment

FIG. 11 illustrates a gyroscope where reference numbers 1111, 1112, 1181, 1182, 1191, 1192 and 116 illustrate the same elements as 1011, 1012, 1081, 1082, 1091, 1092 and 106 in FIG. 10. The synchronization spring 116 operates in the manner described in the first embodiment, and it may be replaced with the meandering synchronization spring described in the second embodiment.

The suspension structure of first inertial mass 1111 will be described in more detail, as in the third and fourth embodiments.

In the illustrated gyroscope, the set of first suspenders comprises two first suspenders 11311 and 11312 and the set of second suspenders comprises one second suspender 11321, and that the set of first suspenders and the set of second suspenders are concatenated in parallel via a double-U-turn intermediate body 1181. The two first suspenders 11311 and 11312 extend in the same longitudinal direction from two separate first anchor points 1121 and 1122, along first and second longitudinal axes, to the intermediate body 1181. The second suspender 11321 extends in the opposite longitudinal direction from the intermediate body 1181 to the inertial mass 1111 along a third longitudinal axis. The first and second longitudinal axes are situated at the same distance from the third longitudinal axis, but on opposite sides of the third longitudinal axis.

Second suspender 11321 is very narrow and fulfils the same function as first suspenders 9311 and 10311 in the third and fourth embodiments. The two first suspenders 11311 and 11312 are coated with out-of-plane transducers. The thickness of the first suspenders 11311 and 11312 may be equal to the thickness of the second suspenders 11321 and 11322. The T-shaped double-U-turn intermediate body 1181 allows second suspender 11321 to be shorter than first suspenders 11311 and 11312. In FIG. 11 one end of the second suspender 11321 is attached to an additional rigid suspender 1191 which protrudes from the inertial mass 1111 between the first anchor points 1121 and 1122, and the other end of the second suspender 11321 is attached to the base of the T-shaped intermediate body 1181. Just like intermediate body 1181, the additional rigid suspender 1191 should be sufficiently short in the x-direction to be significantly more rigid for out-of-plane bending than first suspenders 11311 and 11312. The suspension structure may also be constructed without the additional rigid suspender 1191, but in this case the second suspender 11321 must be longer, so that it extends all the way to inertial mass 1111.

The intermediate body 1181 is a double U-turn intermediate body, shaped like the letter T, which allows the path which traverses the suspension structure to make a 180° turn in two different directions. As in the third and fourth embodiments, the parts which constitute the intermediate body 1181 have relatively small aspect ratios, which makes them stiff for both in-plane and out-of-plane bending. One end of each first suspender 11311 and 11312 is attached to the first anchor points 1121 and 1122, respectively, and the other end of each first suspender is attached to one of the opposing top ends of the T-shaped intermediate body 1181.

Sixth Embodiment

FIG. 12 illustrates a gyroscope where reference numbers 1211, 1212, 1291, 1292 and 126 illustrate the same elements as 1111, 1112, 1191, 1192 and 116 in FIG. 11. The synchronization spring 116 operates in the manner described in the first embodiment, and it may be replaced with the meandering synchronization spring described in the second embodiment.

The suspension structure of first inertial mass 1211 will be described in more detail, as in the preceding embodiments.

In the illustrated gyroscope, the set of first suspenders comprises two first suspenders 12311 and 12312 and the set of second suspenders comprises two second suspenders 12321 and 12322. The set of first suspenders and the set of second suspenders are concatenated in parallel via a double-U-turn intermediate body 1281 with a frame-shaped base 12811 which surrounds a first anchor point 1221. The two first suspenders 12311 and 12312 extend in opposite longitudinal directions along a first longitudinal axis from the first anchor point 1221 to the frame-shaped base 12811 of the intermediate body 1281. The two second suspenders 12321 and 12322 extend along second and third longitudinal axes from the intermediate body 1281 to the inertial mass 1211. The second and third longitudinal axes are situated at the same distance from the first longitudinal axis, but on opposite sides of the first longitudinal axis.

As in the preceding embodiments, first suspenders 12311 and 12312 are very narrow and fulfill the same function as first suspenders 9311 and 10311 in the third and fourth embodiments. The two second suspenders 12321 and 12322 are coated with out-of-plane transducers. The thickness of the first suspenders 12311 and 12312 may be equal to the thickness of the second suspenders 12321 and 12322. The T-shaped double-U-turn intermediate body 1281 allows the first suspenders 12311 and 12312 to be shorter than second suspenders 12321 and 12322.

The intermediate body 1181 is a double U-turn intermediate body, shaped like the letter T, with a frame shaped base 12811 which facilitates a two-sided arrangement of first suspenders 12311 and 12312 around the first anchor point 1221. This two-sided arrangement gives the suspension structure a stronger structural support from the first anchor point 1221 than the one-sided arrangement of first suspenders illustrated in FIGS. 9 and 10 below. In some cases, first suspenders 12311 and 12312 can be made narrower and longer in a two-sided arrangement than in a one-sided arrangement since the weight of the suspension structure and the inertial mass is then distributed over two suspenders instead of one, and the bending mode makes the suspenders stiffer in both in-plane and out-of-plane directions.

As in the preceding embodiments, intermediate body 1281 allows the path which traverses the suspension structure to make a 180° turn in two different directions, and intermediate body is stiff for both in-plane and out-of-plane bending. One end of each second suspender 12321 and 12322 is attached to one of the opposing top ends of the T-shaped intermediate body 1281, and the other end of each second suspender 12321 and 12322 is attached to the inertial mass 1211.

Seventh Embodiment

The synchronization structures presented in the preceding embodiments, which comprise just one synchronization spring between two inertial masses, may be insufficient for suppressing common-mode oscillation. In this undesired oscillation mode, both inertial masses oscillate in the same phase. Even when the drive motion is anti-phase oscillation, common-mode oscillation can sometimes be induced by external disturbances. Additional parts can be added to the synchronization structure to prevent common-mode oscillation from occurring.

FIG. 13 illustrates an exemplary gyroscope where the elements denoted by reference numbers 1311, 1312, 1321, 1322, 13311, 13312, 13321, 13322 and 136 correspond to the elements denoted by reference numbers 1011, 1012, 1021, 1022, 10311, 10312, 10321, 10322 and 106 in FIG. 10. In other words, the synchronization structure includes a synchronization spring 136 between inertial masses 1311 and 1312. The synchronization spring 126 is coated with an in-plane transducer, just like the synchronization spring in FIG. 10, and this in-plane transducer performs the same driving function in FIG. 13 as in the preceding embodiments.

However, in addition to synchronization spring 136, the synchronization structure also comprises a spring system which suppresses common mode oscillation. This spring system comprises a third anchor point 1323 between the first and second inertial masses 1311 and 1312, a first longitudinal spring 1381 extending from the third anchor point 1323 to a first transversal bar 1391, a second longitudinal spring 1382 extending from the first transversal bar 1391 to the first inertial mass 1311, and a third longitudinal spring 1383 extending from the first transversal bar 1391 to the second inertial mass 1312. The spring system may also comprise a fourth anchor point 1324 between the first and second inertial masses 1311 and 1312, a fourth longitudinal spring 1384 extending from the fourth anchor point 1324 to a second transversal bar 1392, a fifth longitudinal spring 1385 extending from the second transversal bar 1392 to the first inertial mass 1311, and a sixth longitudinal spring 1386 extending from the second transversal 1392 bar to the second inertial mass 1312.

The spring system may comprise a synchronization structure at only one longitudinal end of the inertial masses, or at both ends. The latter alternative is illustrated in FIG. 13. The synchronization structure shown in FIG. 13 can be implemented in any of the preceding embodiments.

The second, third, fifth and sixth longitudinal springs 1382-1383 and 1385-1386 may be attached to the side of the inertial masses 1311-1312 which lie opposite to the third and fourth anchor points 1323 and 1324, respectively. This is illustrated in FIG. 13. Alternatively, the second, third, fifth and sixth longitudinal springs 1382-1383 and 1385-1386 may be attached to the inertial masses 1311-1312 closer to the longitudinal symmetry line of each inertial mass.

The springs 1381-1386 and the transversal bars 1391-1392 are narrow in one direction, as illustrated in FIG. 13. The higher their aspect ratio, the more efficient the suppression of the common mode. High aspect ratios are also preferable because synchronization will affect the total spring constant of the desired oscillation modes less when the aspect ratio is high. The aspect ratio of the springs and the transversal bars may preferably be in the range 8-12, but even an aspect ratio of 3.4 suppresses common mode oscillation significantly without changing the spring constant by more than 10%.

The longitudinal springs 1381-1386 may have flexibility for in-plane bending and twisting about the x-axis, but are stiff for out-of-plane bending. The transversal bars 1391-1392 may be stiff for all bending and twisting modes, but they may also be given some flexibility for in-plane bending. Flexibility for in-plane bending may be needed especially if the points of attachment of springs 1382-1383 and 1385-1386 do not lie on the longitudinal middle line of each inertial mass. Flexibility in the transversal bars may also improve the linearity of the in-plane spring action.

Complementary Embodiments

The bending mode of a suspender connected to an inertial mass depends on the resonance frequency of the inertial mass, on the dimensions of the suspender and the voltage applied to the transducer on top of it, and on how the suspender is attached to the oscillating inertial mass. In resonance oscillation, the bending mode of a given suspender will be the same regardless of whether the transducer on the suspender is used for driving or sensing. The inertial mass forces the suspender to assume the bending mode which corresponds to its resonance oscillation.

In other words, although the mechanical actuation of the drive transducer and the force arising from the resonating inertial mass always act together and bend the suspender together, the force arising from the resonating inertial mass is far stronger than an actuating drive force when the inertial mass oscillates in resonance. The bending mode must adapt to the resonance motion.

When the bending of a suspender is dictated by the movement of the inertial mass, the bending mode of the suspender does not necessarily exhibit uniform curvature along the entire length of the suspender.

Figure 14B:
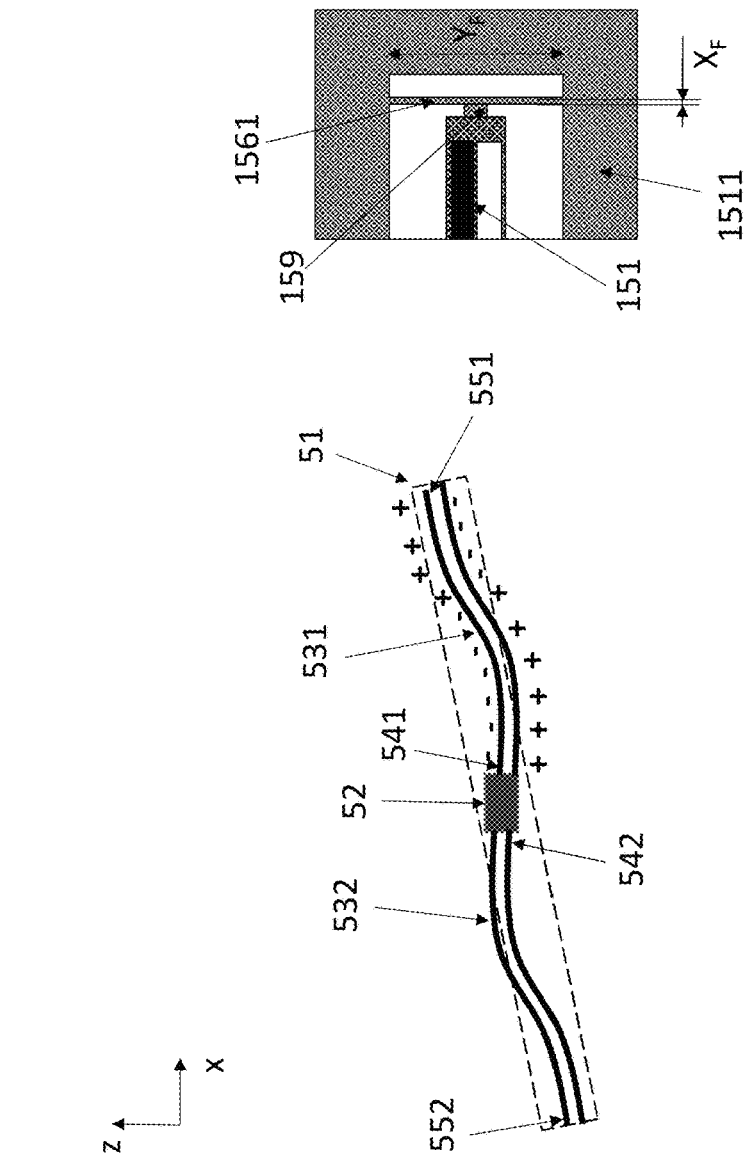
FIG. 14b illustrates the bending of a two-sided suspender in out-of-plane oscillation.

This is illustrated in FIG. 14a for the suspender 631 in FIG. 6 in out-of-plane oscillation. The suspender 631 bends when the inertial mass 611 undergoes out-of-plane rotation about the y-axis. Inflexible attachment at second attachment point 651 may force the outer end of the suspender to move as a guided end. This makes the suspender 631 assume an S-shaped form which creates a sign reversal of the surface stress of the suspender, and thus a sign reversal in the charge between the sides of the corresponding transducers between attachment points 641 and 651, as illustrated in FIG. 14a. The signs in FIG. 14a represent the sign of the surface stress along the suspender on each side of it. If the upper surface of the suspender is coated by the transducer, the signs can also signify the sign of the charge at each side of the transducer. The illustrated bending mode is not optimal because the sense voltage signal is lowered when charges of opposite sign cancel each other out in each sense electrode, and the signal-to-noise ratio will be lowered. FIG. 14b illustrates the same problem for the suspender 531 in FIG. 5 in out-of-plane oscillation. The same problem occurs in in-plane oscillation in both arrangements.

Inflexible attachment and S-shaped bending can make the relationship between external force and suspender displacement non-linear, so that the bending is not characterized by a single spring constant. In case of a drive transducer and high amplitude oscillation produced at resonance, the non-linearity will lower the resonant frequency of oscillation when the amplitude is increased. Also, the energy losses will increase and the effective Q-value will thus decrease due to the nonlinearity, since part of the energy of the oscillation is irreversibly converted to higher harmonic frequencies. The S-shape bending mode also leads to high spring constant values, which may sometimes necessitate larger inertial masses.

To alleviate these problems, it can be beneficial to set the inertial mass to vibrate in a rotary mode which approximates pure rotation as closely as possible. In pure rotation, only a pure bending moment is imparted to the suspender attached to the inertial mass, and the suspender bends with uniform curvature.

In suspension structures which include two-sided arrangements where two suspenders extend in opposite directions from an anchor point or an intermediate body, as in FIG. 7, the bending mode of these suspenders can be improved by preparing a flexure at the attachment point where they are attached to the inertial mass. Flexures 781-784 have been enumerated in FIG. 7.

An exemplary gyroscope may comprise a substrate with at least one anchor point and an inertial mass with a first longitudinal end and a second longitudinal end. The inertial mass may be suspended from the at least one anchor point by a suspension structure which includes two first suspenders extending in opposite longitudinal directions from the at least one anchor point to a frame-shaped part of an intermediate body. Each first suspender may be attached from a first attachment point to its anchor point and from a second attachment point to the frame-shaped part of the intermediate body. One or more first suspenders may be coated with a piezoelectric transducer structure configured to drive or detect oscillating rotary movement in the inertial mass, and these coated suspenders may be attached from the second attachment point to the intermediate body with a flexure.

The term "flexure" refers to an etched silicon structure which is sufficiently flexible to absorb, by bending or twisting, the bending moment acting between the inertial mass and the suspender. For example, flexures 781-784 in FIG. 7 may reduce the bending moment between suspenders 731-734 and the inertial masses 711 and 712 approximately to zero. Flexures thereby reduce the charge distribution disparity between the two sides of the sense transducer by removing the sign reversal of the surface stress and thus that of the charge.

The height of a flexure in the z-direction may be designated $Z_F$. This height may equal the thickness of the inertial mass and the suspenders. In some practical configurations, these heights are on the order of 50 µm.

Figure 15A:
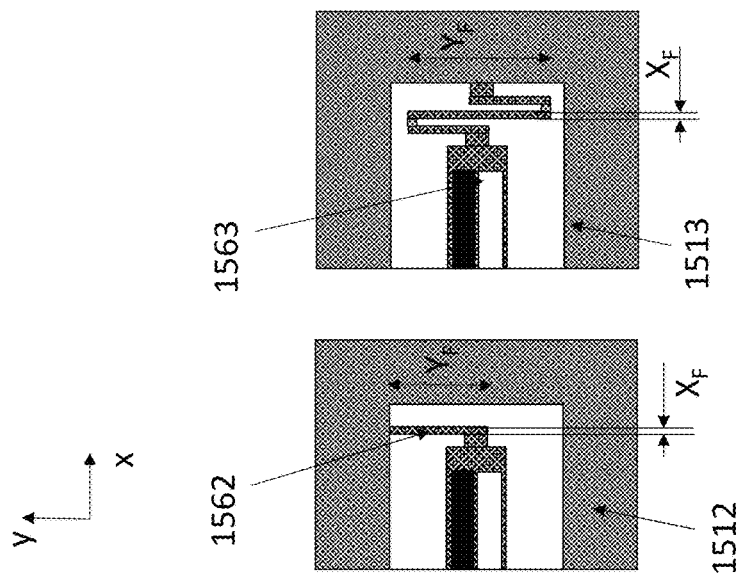
FIGS. 15a-15d illustrates flexures.

$Y_F$ denotes here the length of the flexure in the y-direction. FIG. 15a illustrates three exemplary flexures. The flexure 1561 spans the breadth of the central opening in the inertial mass 1511. The flexure 1562 spans half of the breadth of the central opening in the inertial mass 1512. The flexure 1563 has a meandering shape with a length $Y_F$ which exceeds half of the breadth of the central opening in the inertial mass 1513. The width of the central opening in an inertial mass near the attachment point may, for example, be 30-70% of the width of the inertial mass 1511, 1512, 1513. $X_F$ is the breadth of the flexible spring in the x-direction. Any of the flexures presented in FIG. 15a can be employed in the embodiments presented in this disclosure.

The thickness $Z_F$ of flexures makes them stiff for translational movement out of the xy-plane. Their narrow breadth $X_F$ allows them to flex in the xy-plane when in-plane bending of the inertial mass is transmitted to the suspender, and to twist torsionally about the y-axis when the out-of-plane movement of the inertial mass is transmitted to the suspender.

In other words, the flexures are stiff for translational movement out of the mass plane but flexible for bending in the mass plane, and flexible for torsional twisting about an axis which is parallel to the lengthwise direction of the flexure.

The $Z_F/X_F$ and $Y_F/X_F$ aspect ratios determine to what extent the flexure can absorb the bending moment at the attachment point. Large aspect ratios facilitate easy bending and twisting, but $X_F$ must remain sufficiently large to be easy to manufacture and to allow the flexure to withstand the mechanical strain which arises in the bending and twisting. The aspect ratios therefore have optimal lower and upper limits.

In the case of the meandering flexure 1563 in FIG. 15a, the relevant aspect ratios may be calculated as $Z_F/X_F$ and $\Sigma Y_F/X_F$, where $\Sigma Y_F = Y_{51} + Y_{52} + Y_{53} \ldots$ is the sum of the lengths of all components of the meandering flexure in the y-direction.

The $Z_F/X_F$ aspect ratio may be called height/breadth aspect ratio, and the $Y_F/X_F$ and $\Sigma Y_F/X_F$ aspect ratios may be called length/breadth aspect ratios.

Partial absorption of the bending moment at the second attachment point may be achieved when the height/breadth and length/breadth aspect ratios equal to 2. Almost complete absorption of the bending moment may be achieved when the height/breadth and length/breadth aspect ratios are greater than 4. The height/breadth aspect ratio can be increased up to 10 without compromising manufacturability or stress durability. The length/breadth aspect ratio doesn't have such a manufacturing limit or strength limit but the length of the flexure must be much less than the suspension length so that the total spring coefficient is not influenced. The height/breadth aspect ratio greater than 10 will absorb all the bending moment at the second attachment point, but the manufacturability suffers and stress durability becomes weaker, and it may cause yield loss and decrease of the shock resistance.

The mechanics of flexing and twisting movement in the flexures depend on their dimensions and on the dimensions of the second attachment points. This is illustrated schematically in FIGS. 15b-15d, where the flexure 1561 in FIG. 15a has been drawn. In this case the flexure 1561 is as thick as the inertial mass in the z-direction, so the flexure 1561 is attached to the inertial mass 1511 from 1581 to 1582 and from 1571 to 1572. 159 is an optional narrow silicon bridge at the end of the suspender 1531. The suspender 1531 could also be attached to the flexure along its entire breadth, without a narrow bridge.

Figure 15B:
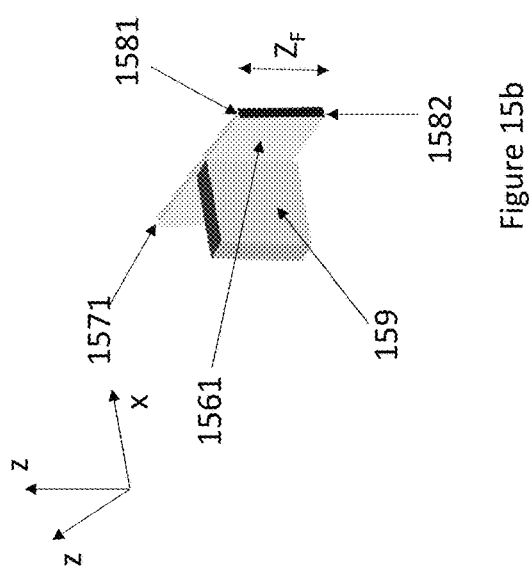
Figure 15D:
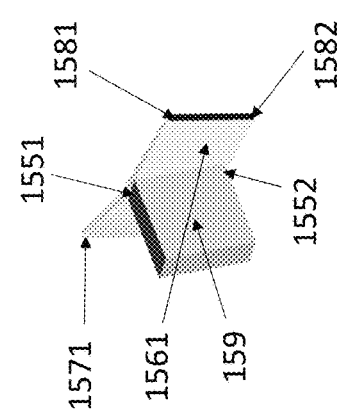
Figure 15C:
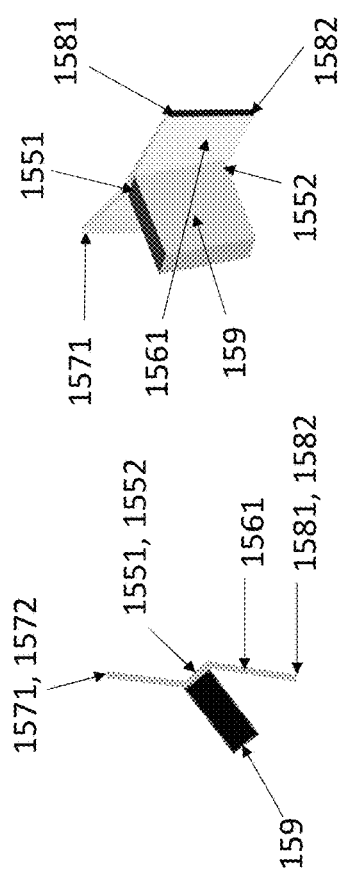

FIG. 15c illustrates schematically the bending of the flexure 1561 when the inertial mass undergoes in-plane rotation, viewed in the xy-plane. The width of the second attachment point has been exaggerated to improve clarity, and the angle of rotation indicated in FIG. 15c is for the same reason much larger than the angle an inertial mass would normally obtain in a MEMS resonator. The flexure 1561 remains attached to the moving inertial mass at points 1571-1572 and 1581-1582, but bends at the middle so that no bending moment is transferred from the inertial mass to the second attachment point 1551-1552 and onward to the suspender 1531.

FIG. 15d illustrates schematically the bending of the flexure 1561 when the inertial mass has undergone out-of-plane rotation clockwise about the y-axis, viewed from the same angle as in FIG. 15b. The flexure 1561 becomes torsionally twisted about the y-axis, so that the upper edge and the lower edge move in different directions on the x-axis. At both ends of the flexure 1561, the upper corners 1571, 1581 of the flexure remain aligned with the lower corners 1572, 1582. The angle of rotation indicated in FIG. 15d is larger than the rotation angle an inertial mass would normally obtain in a MEMS resonator. The flexure 1561 twists at the middle, so that no bending moment is transferred from the inertial mass to the suspender 1531. The suspender 1531 is illustrated with an in-plane transducer in FIG. 15a, but it would be coated with an out-of-plane transducer when that is the intended rotation mode.

Figure 16:
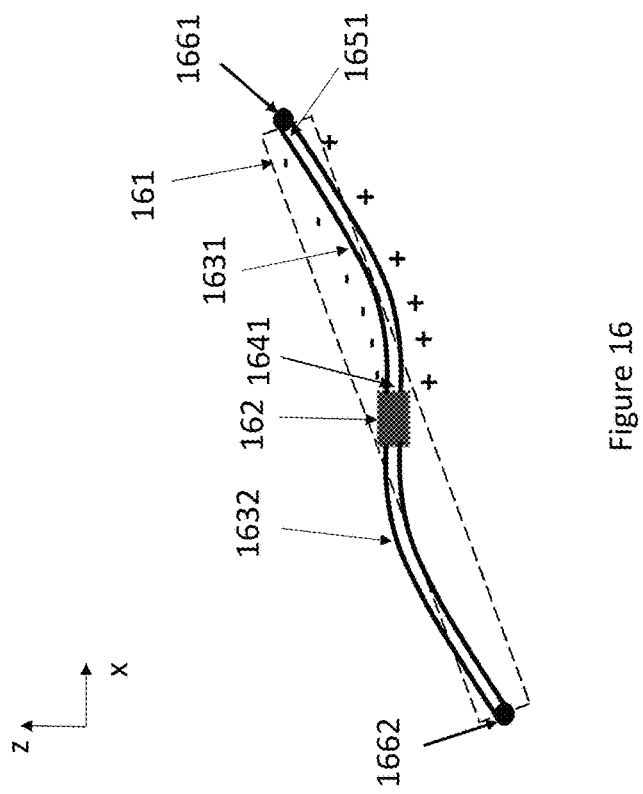
FIG. 16 illustrates the bending of a two-sided suspender in out-of-plane oscillation.

The technical effect of torsional twisting in flexures is illustrated in FIG. 16. For reasons of clarity the flexures 1661, 1662 have been illustrated only with a black dot and the suspenders 1631, 1632 have been drawn relatively thin, even though both flexures and suspenders may be as thick as the inertial mass 161 in the z-direction. The torsional twist in the flexures 1661, 1662 allows the suspenders 1631 and 1632 to assume a shape where the curvature is in the same direction along the entire length of the suspenders.

Consequently, the surface stress on the suspender and thus the accumulated charge on either side of the transducer has the same sign along the entire length of the suspender. This allows the inertial mass to be driven more effectively, and it conversely allows a stronger sense signal to be detected in the sense mode with simplified transducer geometry. The transducer is strongly coupled to the bending mode of the suspender for most of its length, and the suspender oscillation is linear even in large displacements. Linearity facilitates an increase in the oscillation amplitude of the inertial mass without increased mechanical losses or a change in oscillation frequency.

In other words, the advantages obtained with flexures include transducer charge distributions which exhibit no sign reversal along the length of the suspender, suspender bending modes with low spring constants, and consequently high piezoelectric transducer capacitances and small size of the resonator at a given resonant frequency. In gyroscopes these benefits facilitate small motional resistance, high coupling factors, reliable and fast startup of the oscillation and high signal-to-noise ratios in the sense voltage signal. The flexures also facilitate stress relief in the suspenders because they flex in the lengthwise direction of the suspender (in the x-direction in FIG. 16), which greatly improves the linearity of the resonator.

The same surface stress, charge distribution, stress relief and linearity considerations apply to the resonator and suspenders in FIG. 16 when the inertial mass 161 is driven into in-plane rotation about the z-axis.

As illustrated graphically in FIG. 16, the charge density in the transducer may be higher close to the first attachment point 1641 than it is near the second attachment point 1651 in the illustrated bending mode. In other words, the suspender 1631 may bend with a larger curvature close to the first attachment point 1641 than it bends close to the second attachment point 1651. It may for this reason be beneficial to shorten the transducer on the suspender 1631 so that it covers, for example, 50-70% of the length of the suspender, starting from the end which is closer to the first attachment point. In other words, the piezoelectric transducer structure on at least one coated suspender may extend along the suspender from the first attachment point to a point whose distance from the first attachment point corresponds to 50-70% of the length of suspender.

Additional benefits can be gained if the combined effective center of gravity of the inertial mass and the suspension structure coincides, or at least approximately coincides, either (in the case of out-of-plane oscillation) with the rotational axis of the inertial mass or (in the case of out-of-plane oscillation) with a transversal line which crosses the rotational axis of the inertial mass.

If a coated suspender in a suspension structure has an even transversal breadth and vertical height profile, and if the geometry of the suspension structure allows the coated suspender to be placed approximately symmetrically in relation to the transversal symmetry axis $a_T$, then the longitudinal distance from either end of the coated suspender to the transversal line which passes through the effective center of gravity of the inertial mass may, for example, be 0.4-0.6 times, or 0.49-0.51 times, the length of the coated suspender. When the rotation axis of the inertial mass coincides with the center of gravity, such suspenders experience a constant bending moment along their entire length. All suspenders coated with out-of-plane transducers in FIGS. 8-13 are suspenders of this kind. However, this optimization is not applicable to the coated suspenders illustrated in FIG. 7. The term "effective center of gravity" refers to the fact that the inertial mass and the suspension structure move together, and the weight of the suspension structure may not be negligible in comparison to the weight of the inertial mass.

However, since one end of the suspension structure is fixed to an anchor point, only part of the suspension structure will contribute a mobile mass component to the oscillating motion. Balanced rotation around a rotation axis requires that the combined effective center of gravity of the suspension structure and the inertial mass lies on, or at least close to, the rotation axis. The effective center of gravity must be calculated with a physical model.

Figure 17:
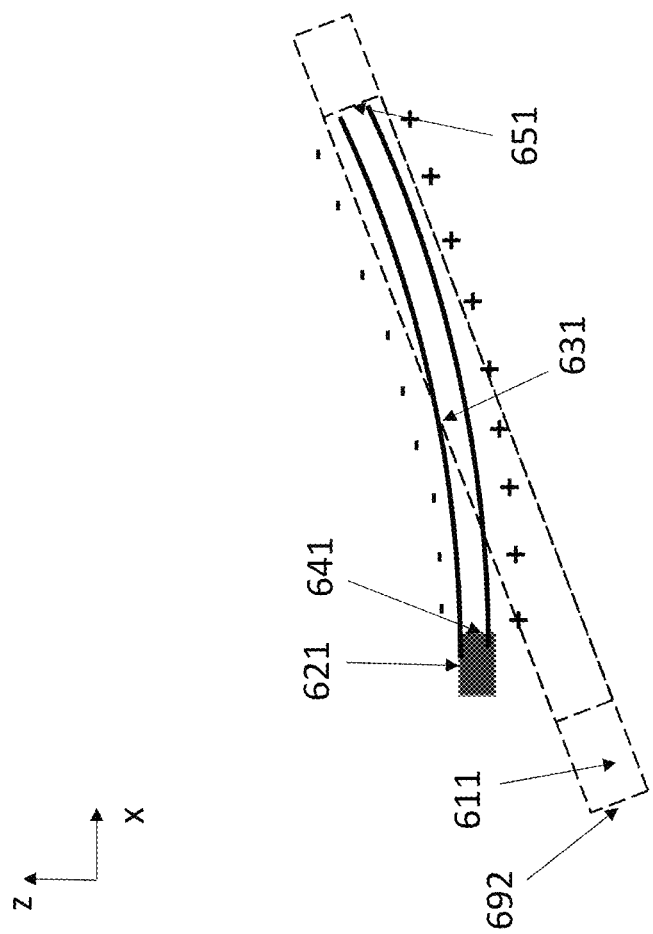
FIG. 17 illustrates the bending of a one-sided suspender in out-of-plane oscillation.

The term "effective" refers, firstly, to the fact that the additional mass contributed by the suspension structure to the total mobile mass varies as a function of its degree of bending. FIG. 17 illustrates the out-of-plane bending of suspender 631 in FIG. 6. The mobile weight which is added to the resonator due to the movement of the suspender 631 may be modelled as an effective mass located at the second attachment point 651 where the suspender is attached to the inertial mass. This calculated correction takes into account the additional mass which becomes mobile due to the kinetic energy of the partly moving suspender and added kinetic energy due to the possible flexibility of the inertial mass.

Secondly, the term "effective" also refers to the fact that the inertial mass may not be entirely rigid in its longitudinal direction, and an additional weight component dependent on the degree of bending may have to be calculated to take this flexibility into account, especially in out-of-plane oscillation. For example, in the inertial masses depicted in FIG. 17, the portion of the inertial mass 611 which is close to the second longitudinal end 692 of the inertial mass (and far from second attachment point 651 where the suspender is attached to the inertial mass) may bend slightly away from the longitudinal symmetry line of the inertial mass when the inertial mass oscillates. The mobile weight which is added to the resonator by this bending may be modelled as an effective mass located at the second longitudinal end 692.

When the translational forces imparted by the inertial mass 611 on the coated suspender 631 at the second attachment point zero or very close to zero, the bending mode can be characterized as nearly pure rotation. The inertial mass 611 imparts only a bending moment to the suspender 631 at the second attachment point 651 as it oscillates in resonance. This motion bends the suspender 631 into a parabolic shape, because the local radius of curvature of the suspender 631 is proportional to the local bending moment, and the local bending moment is constant along the length of the suspender 631 when it is fixed at the first attachment point 641 and turned only by a bending moment at the second attachment point 651. A strong sense signal can then be read from a sense transducer on the suspender 631 because charge accumulation is uniform along its entire length, as illustrated in FIG. 17.

The same effects influence the location of the effective center of gravity in more complicated suspension structures which include the concatenated suspenders illustrated in FIGS. 9-13. If the combined effective center of gravity of the inertial mass and the suspension structure is on the rotation axis of the inertial mass (in out-of-plane rotation) or the transversal line which crosses the rotation axis (in in-plane rotation), then the inertial mass will impart a pure bending moment to the suspension structure at the attachment point(s) where the suspension structure is attached to the inertial mass. This pure bending moment load will be transmitted in the suspension structure to the suspender which is flexible for the imparted bending mode. Suspenders and intermediate bodies which are rigid in this bending mode will not influence the bending moment.

Displacing the effective center of gravity (ECOG) from the rotation axis (RA) makes the resonator more sensitive to external disturbances. The rotation axis of the inertial mass is transversal, in other words parallel to the y-axis, in out-of-plane bending. A longitudinal distance, hereafter referred to as the ECOG-RA distance, can in this case be measured from the transversal line which passes through the effective center of gravity, to the rotation axis (RA). When the resonator oscillates in-plane, the rotation axis of the inertial mass is parallel to the z-axis. In this case the ECOG-RA distance can be measured from the transversal line which passes through the effective center of gravity (ECOG) of the resonator to the transversal line which passes through the rotation axis (RA) of the inertial mass.

If the ECOG-RA distance is nonzero and an out-of-plane resonator is exposed to external linear vibration, then the inertial mass will experience a torque about its rotation axis. If the resonator is utilized in a gyroscope coupled to another resonator in differential mode, the torque will force both inertial masses to rotate in the same direction about their rotation axis, and the output signal disturbances created by the linear vibration shock in the two transducers will cancel each other. However, if the signal is too large it may overload the common mode capability of the input amplifier. Any asymmetry in the transducers, due to e.g. manufacturing tolerances, will produce a differential signal which is amplified as the output signal of the gyroscope. If, on the other hand, the ECOG-RA distance is nonzero and the same gyroscope is exposed to external rotational vibration about its longitudinal axis, then the torque will force the two inertial masses to rotate in opposite directions and the output signal disturbances will be added to each other. The disturbance cannot in this case be separated from the output signal due to the Coriolis force.

The ECOG-RA distance, which causes the disturbing torque, should preferably be minimized, but it may not always be possible to reduce it exactly to zero due to restrictions posed by manufacturing tolerances. Furthermore, as explained above, the effective center of gravity in out-of-plane oscillation may not exactly coincide with the effective center of gravity in in-plane oscillation, so the ECOG-RA distance may not be reducible to zero for both rotation modes in an inertial mass which is configured to undergo in-plane and out-of-plane oscillation simultaneously.

The invention claimed is:
1. A microelectromechanical gyroscope comprising
   a substrate which defines a device plane and comprises one or more first anchor points and one or more second anchor points,
   a first inertial mass and a second inertial mass, wherein the first inertial mass is suspended from the one or more first anchor points by a first suspension structure configured to allow the first inertial mass to oscillate rotationally both in the device plane and out of the device plane, and the second inertial mass is suspended from the one or more second anchor points by a second suspension structure configured to allow the second inertial mass to oscillate rotationally both in the device plane and out of the device plane, and
   at least one of the first and second suspension structures comprises one or more suspenders coated with piezoelectric transducer structures configured to detect an oscillating motion of the first suspended inertial mass or the second suspended inertial mass out of the device plane, a synchronization structure which includes a synchronization spring attached to the first inertial mass at a first attachment point and to the second inertial mass at a second attachment point, wherein the synchronization spring is coated with a piezoelectric transducer structure configured to drive the first and the second inertial masses into anti-phase drive oscillation in the device plane.

2. A microelectromechanical gyroscope according to claim 1, wherein the coated synchronization spring is a straight spring aligned with a transversal symmetry axis of the gyroscope.

3. A microelectromechanical gyroscope according to claim 1, wherein the coated synchronization spring is a meandering spring.

4. A microelectromechanical gyroscope according claim 1, wherein the first and second suspension structures are significantly more flexible for in-plane bending than the synchronization spring.

5. A microelectromechanical gyroscope according to claim 1, wherein the first attachment point lies in a first cavity in the first inertial mass, the second attachment point lies in a second cavity in the second inertial mass, and the synchronization spring lies partly within the first cavity and partly within the second cavity.

6. A microelectromechanical gyroscope according to claim 1, wherein at least one of the suspension structures comprises
a set of first suspenders comprising one or more first suspenders arranged so that an in-plane spring constant of the set of first suspenders is configured to be smaller than an out-of-plane spring constant, and
a set of second suspenders comprising one or more second suspenders coated with piezoelectric transducer structures which are configured to detect oscillating motion out of the device plane by the first inertial mass or the second inertial mass to which the at least one of the suspension structures is attached, wherein an out-of-plane spring constant of the set of second suspenders is configured to be smaller than an in-plane spring constant,
wherein the set of first suspenders and the set of second suspenders are concatenated in the at least one of the suspension structures.

7. A microelectromechanical gyroscope according to claim 6, wherein the in-plane spring constant of the set of second suspenders divided by the in-plane spring constant of the set of first suspenders is a ratio in the range 3 to 10.

8. A microelectromechanical gyroscope according to claim 6, wherein the set of first suspenders comprises one first suspender and the set of second suspenders comprises one second suspender, and that the set of first suspenders and the set of second suspenders are concatenated in parallel via a U-turn intermediate body, so that the first suspender extends in a first longitudinal direction along a first longitudinal axis from the first or second anchor point to the intermediate body, and the second suspender extends in an opposite longitudinal direction along a second longitudinal axis from the intermediate body to the inertial mass.

9. A microelectromechanical gyroscope according to claim 6, wherein the set of first suspenders comprises one first suspender and the set of second suspenders comprises two second suspenders, and that the set of first suspenders and the set of second suspenders are concatenated in parallel via a double U-turn intermediate body, so that the first suspender extends in a first longitudinal direction, along a first longitudinal axis, from the first or second anchor point to the intermediate body, and both of the second suspenders extend in an opposite longitudinal direction from the intermediate body to the inertial mass along second and third longitudinal axes.

10. A microelectromechanical gyroscope according to claim 6, wherein the set of first suspenders comprises two first suspenders and the set of second suspenders comprises one second suspender, and that the set of first suspenders and the set of second suspenders are concatenated in parallel via a double-U-turn intermediate body, so that the two first suspenders extend in the same longitudinal direction from two separate first anchor points, along first and second longitudinal axes, to the intermediate body, and that the second suspender extends in an opposite longitudinal direction from the intermediate body to the first inertial mass along a third longitudinal axis, so that the first and second longitudinal axes are situated at the same distance from the third longitudinal axis, but on opposite sides of the third longitudinal axis.

11. A microelectromechanical gyroscope according to claim 6, wherein the set of first suspenders comprises two first suspenders and the set of second suspenders comprises two second suspenders, and that the set of first suspenders and the set of second suspenders are concatenated in parallel via a double-U-turn intermediate body with a frame-shaped base which surrounds a first anchor point, and that the two first suspenders extend in opposite longitudinal directions along a first longitudinal axis from the first anchor point to the frame-shaped base of the intermediate body, and that the two second suspenders extend along second and third longitudinal axes from the intermediate body to the first inertial mass, so that the second and third longitudinal axes are situated at the same distance from the first longitudinal axis, but on opposite sides of the first longitudinal axis.

12. A microelectromechanical gyroscope according to claim 6, wherein the synchronization structure also comprises a spring system which includes a third anchor point between the first and second inertial masses, a first longitudinal spring extending from the third anchor point to a first transversal bar, a second longitudinal spring extending from the first transversal bar to the first inertial mass, and a third longitudinal spring extending from the first transversal bar to the second inertial mass.

* * * * *